US012008768B2

(12) United States Patent
Olmstead

(10) Patent No.: US 12,008,768 B2
(45) Date of Patent: Jun. 11, 2024

(54) SPATIALLY-AWARE CAMERA AND METHOD THEREOF

(71) Applicant: Visual Robotics Systems Inc., Eugene, OR (US)

(72) Inventor: Bryan Lee Olmstead, Eugene, OR (US)

(73) Assignee: Visual Robotics Systems, Inc., Eugene, OR (US)

( * ) Notice: Subject to any disclaimer, the term of this patent is extended or adjusted under 35 U.S.C. 154(b) by 372 days.

(21) Appl. No.: 17/055,108

(22) PCT Filed: Sep. 24, 2019

(86) PCT No.: PCT/US2019/052725
§ 371 (c)(1),
(2) Date: Nov. 12, 2020

(87) PCT Pub. No.: WO2020/068849
PCT Pub. Date: Apr. 2, 2020

(65) Prior Publication Data
US 2021/0268659 A1 Sep. 2, 2021

Related U.S. Application Data

(60) Provisional application No. 62/736,211, filed on Sep. 25, 2018.

(51) Int. Cl.
G06T 7/20 (2017.01)
B25J 9/16 (2006.01)
(Continued)

(52) U.S. Cl.
CPC ............... G06T 7/20 (2013.01); B25J 9/1697 (2013.01); G06T 7/55 (2017.01); G06V 10/751 (2022.01); G06V 10/62 (2022.01)

(58) Field of Classification Search
CPC ............ B25J 9/1697; G01C 11/00–36; G05B 2219/37115; G06T 7/50; G06T 7/55;
(Continued)

(56) References Cited

U.S. PATENT DOCUMENTS 8,099,877 B2 * 1/2012 Champ ................. G01B 21/04
33/503
2006/0008136 A1 1/2006 Leroux
(Continued)

FOREIGN PATENT DOCUMENTS

WO WO-2006084385 A1 * 8/2006 ............. G01C 11/06

OTHER PUBLICATIONS

Zuza, Mikolas, "Photogrammetry—3D scanning with just your phone/camera," Mar. 13, 2018, Prusa Research, https://blog.prusa3d.com/photogrammetry-3d-scanning-just-phone-camera_7811/ (Year: 2018).*

(Continued)

Primary Examiner — Spencer D Patton
(74) Attorney, Agent, or Firm — Elliott, Ostrander & Preston, P.C.

(57) ABSTRACT

Mobile apparatus (e.g., robotic systems and mobile vehicles) use one or more cameras fixed to the apparatus so that the cameras move when the mobile apparatus moves. The cameras acquire images of the world space in which the apparatus operates, and the images are processed to develop information about objects sharing the world space with the mobile apparatus. This information permits a control system to direct the apparatus to interact with (or avoid) the objects.

12 Claims, 26 Drawing Sheets

(51) Int. Cl.
  *G06T 7/55* (2017.01)
  *G06V 10/62* (2022.01)
  *G06V 10/75* (2022.01)
(58) Field of Classification Search
  CPC ..... G06T 7/578; G06T 7/593; G06T 7/70–77; G06V 10/00–993
  See application file for complete search history.

(56) References Cited

U.S. PATENT DOCUMENTS

| | | | |
|---|---|---|---|
| 2011/0234815 A1* | 9/2011 | Zahnert | H04N 1/3876 |
| | | | 348/207.1 |
| 2012/0290134 A1 | 11/2012 | Zhao et al. | |
| 2016/0113728 A1* | 4/2016 | Piron | A61B 34/30 |
| | | | 606/130 |
| 2016/0189362 A1* | 6/2016 | Evers-Senne | G01S 17/08 |
| | | | 348/46 |
| 2019/0192950 A1* | 6/2019 | Tuxen | G06T 7/73 |
| 2021/0123717 A1* | 4/2021 | Wierda | G01B 21/04 |

OTHER PUBLICATIONS

International Search Report and Written Opinion for International Patent Application No. PCT/US2019/052725, mailed Jan. 31, 2020, 13 pages.

* cited by examiner $$s\begin{bmatrix}u\\v\\1\end{bmatrix} = \begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix}$$

Figure 12

SPATIALLY-AWARE CAMERA AND METHOD THEREOF

CONTINUITY AND CLAIM OF PRIORITY

This is a U.S. national-stage utility patent application filed under 35 U.S.C. § 371, which claims priority to international ("PCT") patent application no. PCT/US2019/052725 filed 24 Sep. 2019 and U.S. provisional patent application No. 62/736,211 filed 25 Sep. 2018.

FIELD

The invention relates to the capture of three-dimensional data of objects and scenes by optical means. More specifically, the invention relates to the capture of three-dimensional data with one or more cameras mounted upon a mobile platform so that the camera(s) move when the mobile platform moves.

BACKGROUND

There are many occasions where it is beneficial to capture a three-dimensional representation of objects or a scene by optical means, such as by using a camera. Captured scene geometry can be used by a machine vision system to direct a robot arm to grab objects in a pick-and-place operation, providing improved performance of a robotic system compared to one without the vision system. A captured three-dimensional scene can be used by a mobile robot to navigate through its environment. The three-dimensional data captured by a flying vehicle, such as a drone, can be used in its own light as a digital representation of a portion of the real-world, such as for mapping or inspection purposes.

A so-called 3D camera is able to capture the geometry of a portion of a scene from a static vantage point. Capture of a more complete rendering of a scene can be accomplished by viewing the scene from multiple vantage points. Placement of a camera on a mobile platform, such as a robot arm, mobile robot, or drone, increases the complexity of processing necessary to determine a three-dimensional model of a scene. Knowledge of the camera location during the scene capture is important to determining an accurate model of the scene.

Techniques vary on how to determine the location of a moving camera in space during the image capture process. Temporarily stopping motion during the capture of an image, to eliminate motion blur and to ensure known location of the camera during the camera exposure, is a common technique. An alternate technique uses processing power to determine camera location. The amount of motion of the camera between camera frames is computed by matching image features between frames, using a technique known as VSLAM (Visual Simultaneous Location And Mapping). Another technique uses dead reckoning using an IMU (Inertial Measurement Unit) to estimate the amount of motion from frame to frame. This technique is complicated by the difference in latency between the measurements from the IMU compared to the camera, which is mitigated by moving the camera at a slow rate of speed relative to its frame rate.

SUMMARY

The present invention advances the state of the art by robustly determining the position and orientation of the mobile camera in space at the time of image exposure. If the location and orientation of the camera can be known for each frame in the camera's sequence of images, determining the three-dimensional configuration of the captured scene is greatly simplified.

The current location of the camera in space is recorded using the best evaluation of the data from potentially multiple sources. The location and orientation of the mobile apparatus (robot arm, mobile robot, drone) that the camera is attached to may be available by the device itself, via joint angles, dead reckoning of the wheels, GPS, or other telemetry data, providing an external indication of the camera location and orientation. The location and orientation of the camera may be determined by internal means, using inertial measurement using an IMU, magnetic compass, and/or barometer. These types of measurements are typically provided at a rate faster than the frame rate of the camera. Information from all available sources is combined to determine the best representation of the current location and orientation of the camera at the time of the camera exposure.

Prior art techniques for combining data from the above-mentioned sensors and data obtained from the camera itself, such as by VSLAM, are hindered by the latency between capture of the image during exposure and the subsequent processing in the computer. The invention can solve this problem by embedding the location data into the image stream itself, so that subsequent image processing can use data from other sensors that have been correlated in time with the image exposure time. This greatly simplifies the processing by ensuring that all the data being processed has been time aligned.

Compared to techniques where the mobile platform must temporarily stop to ensure that the camera is in a known location and orientation during the exposure of the image, the present invention provides accurate data even when the camera is moving.

BRIEF DESCRIPTION OF DRAWINGS

FIG. 12 shows the elements of a Camera Matrix.

DETAILED DESCRIPTION

Embodiments of the invention may be comprised of prior-art robotic hardware components such as multi-degree-of-freedom mobile apparatus, effectors, cameras and control systems; or by purpose-built robotic hardware with similar components. Embodiments improve the operation of such hardware systems by acquiring and processing information from the components differently, so that the robot can complete its tasks faster and more accurately.

Figure 1:
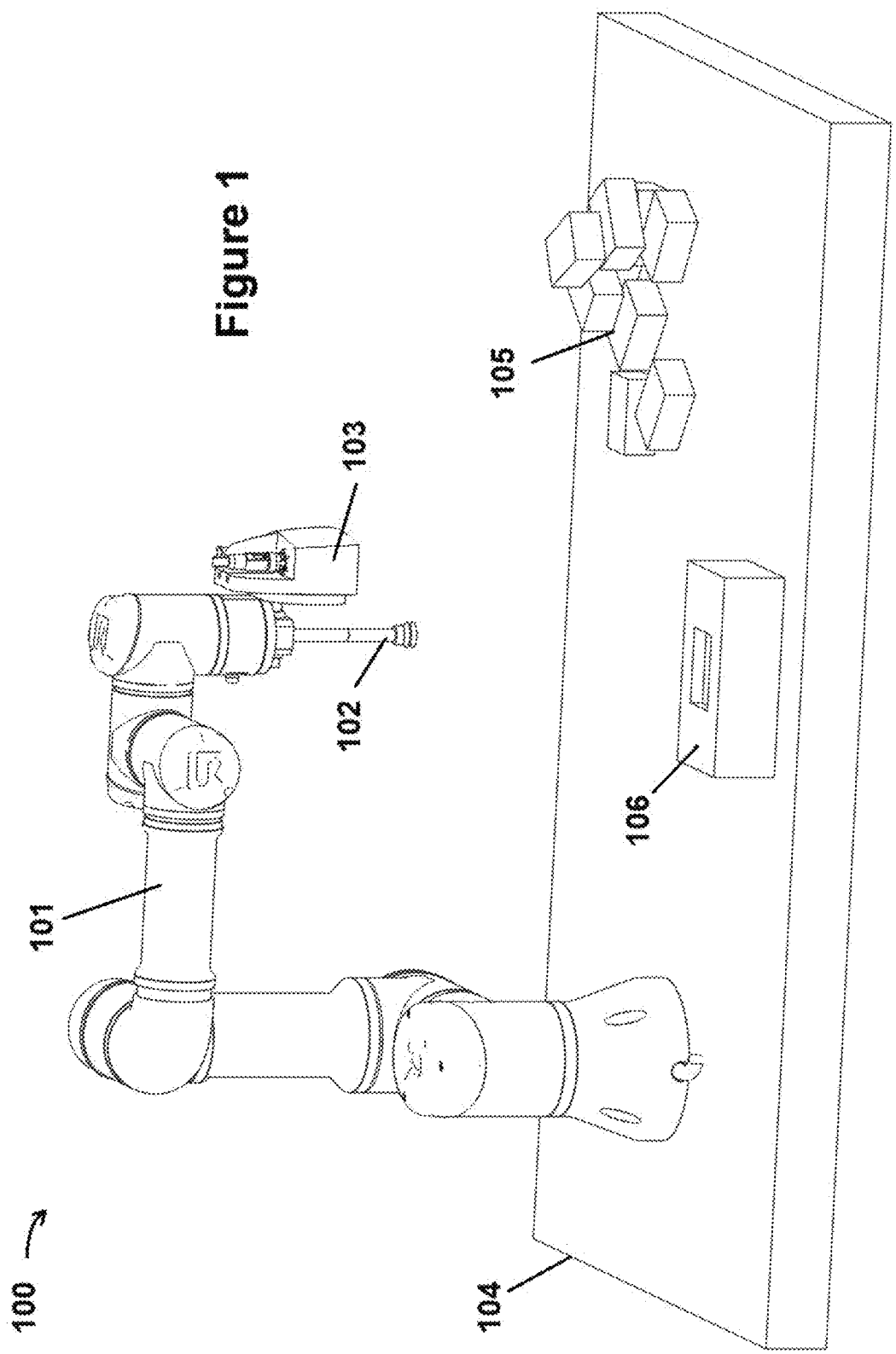
FIG. 1 is a schematic view of an exemplary use of the invention, showing a camera mounted onto a robotic arm.

FIG. 1 shows a typical use for a mobile camera in determining the three-dimensional data of an object or scene. A robotic cell 100 consists of a workspace 104 containing objects to be measured 105. A robotic arm 101 contains a mobile camera 103 (i.e., a camera mounted on a mobile apparatus so that the camera moves when the apparatus moves) used for measuring the three-dimensional data of the objects 105 that the robotic arm will manipulate. An application for measuring the three-dimensional data of objects 105 is for the robot arm gripper 102 to pick up the objects 105 and place it in a work area 106 for processing. Such a scenario is called pick-and-place. A typical object 105 in a machine shop environment is a block of aluminum and the work area 106 may be a CNC (Computer Numeric Controller) machine. The robot arm gripper 102 would pick up the aluminum block 105 and place it into the CNC machine 106 to be machined. The robot arm gripper 102 would remove the block 105 from the CNC machine 106 when the machining is completed. The advantage of using a mobile camera 103 in the robotic cell 100 would be to allow the objects 105 to be located at an imprecise location, such as being placed by hand. Robotic workcells 100 without a mobile camera 103 would require the objects 105 to be located at a precise location, such as being set in a fixture. A workcell 100 can use a machine vision camera system that is not mobile (i.e., the camera is not mounted as shown at 103), but the robot arm 101 may occlude the a stationary camera's view of objects 105 and prevent the system from working as well as an embodiment of the invention.

Figure 2:
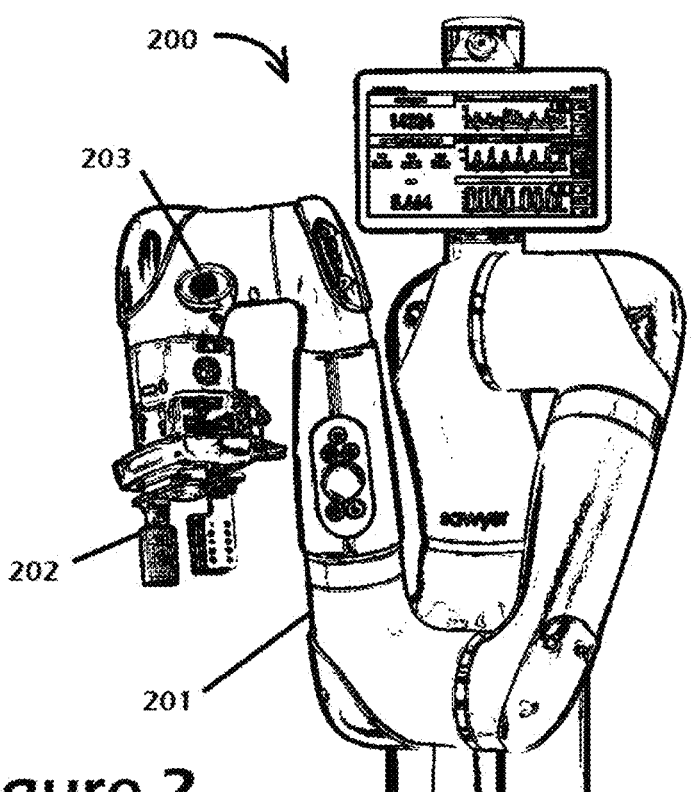
FIG. 2 is a drawing of a prior art robotic arm by Rethink Robotics, product "Sawyer", containing an arm mounted camera.

In the last few years, mobile mounting of cameras on robots has become more common. FIG. 2 shows a prior art robot 200 called Sawyer, manufactured by Rethink Robotics. The robot arm 201 contains a gripper 202 and an embedded two-dimensional camera 203. The camera 203 is used to visually measure the location of objects and to determine their identity. A typical application requires that the robot arm 201 be stopped during the capture of the picture from the camera 203, so that the location of the camera can be accurately determined from the measured joint locations from the robot arm 201. Use of a two-dimensional camera 203 and a single measurement location does not permit the calculation of the three-dimensional data of objects without certain assumptions. If it is assumed that the objects are at a known distance Z from the camera 203, such as short objects on a conveyor belt, then the remaining spatial coordinates (X,Y) of the object can be determined from a single vantage point, by processing the image from camera 203.

Figure 3:
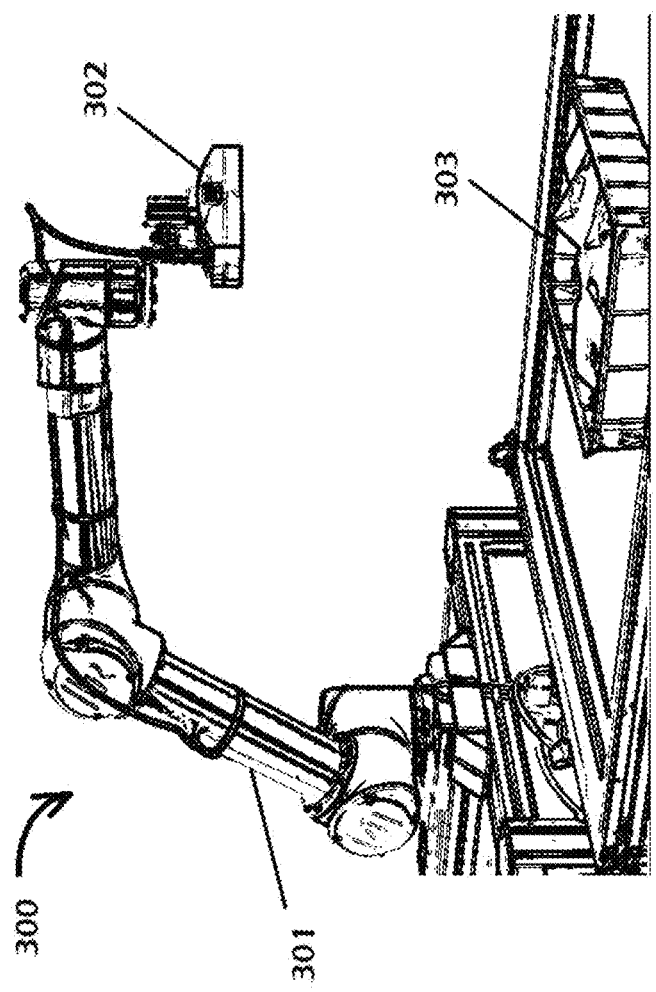
FIG. 3 is a drawing of a prior art robotic arm by Universal Robotics, product "UR3", with an attached 3D camera called "Pickit3D".

FIG. 3 shows a prior art camera system 300 that uses a robotic arm 301, called the UR3, manufactured by Universal Robotics, and an attached three-dimensional camera 302, called PickIt3D. This camera 302 is used to determine the data of objects 303 in its field of view. Because the camera 302 is a three-dimensional camera, the three-dimensional data of objects 303 are able to be determined from a single vantage point. However, only the visible geometry can be determined from this vantage point. There are portions of an object 303 that can be occluded by other objects or by the shape of the object itself. The camera 302 can be moved by the robot arm 301 to different locations in order to measure the data of previously hidden portions of objects 303. However, the robot arm 301 must be stopped during the capture of the image from camera 302 in order for the location of the camera to be known using this system.

Figure 4:
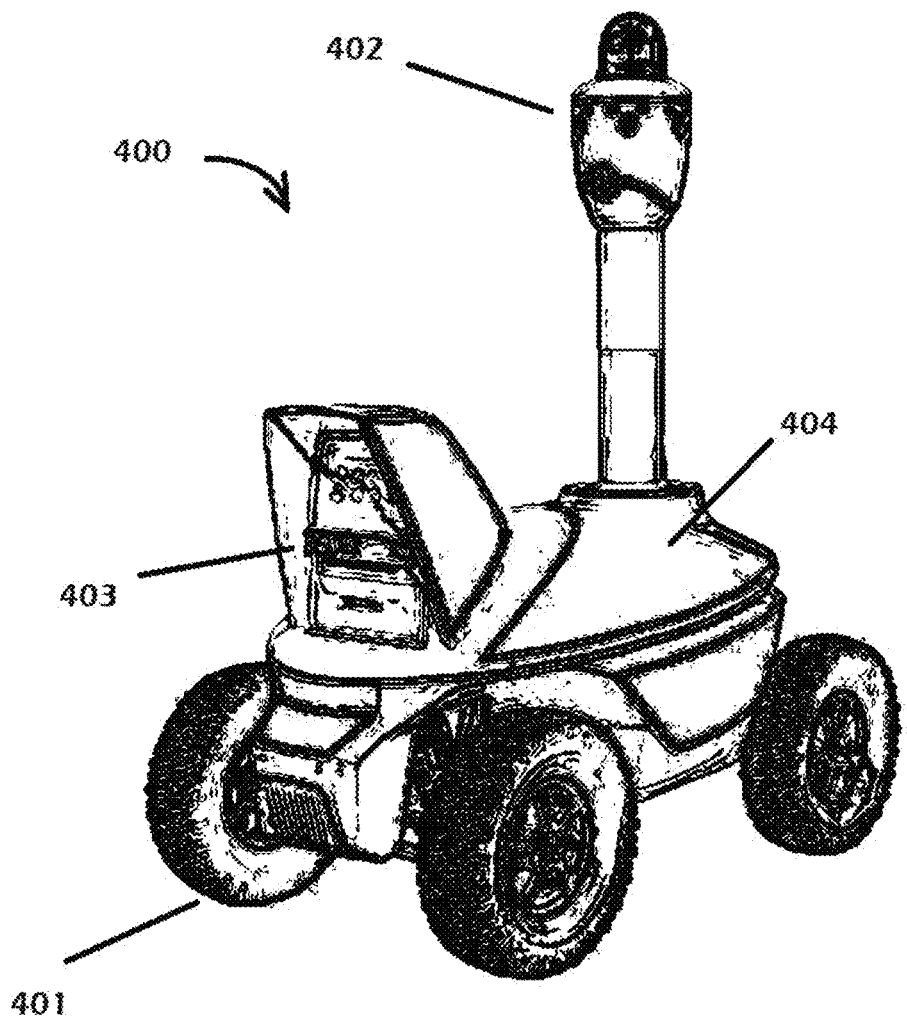
FIG. 4 is a drawing of a prior art mobile robot by SMB robotics that contains a camera for navigation.

FIG. 4 shows a prior art system using cameras 402 and 403 on a mobile robotic platform 400. This device uses wheels 401 for translating through its environment, although some mobile robots use legs or other mechanical devices for locomotion. The system 400 uses information captured from cameras 402 and 403 to navigate using the processing system 404 using methods such as VSLAM (Visual Simultaneous Location And Navigation).

Figure 5:
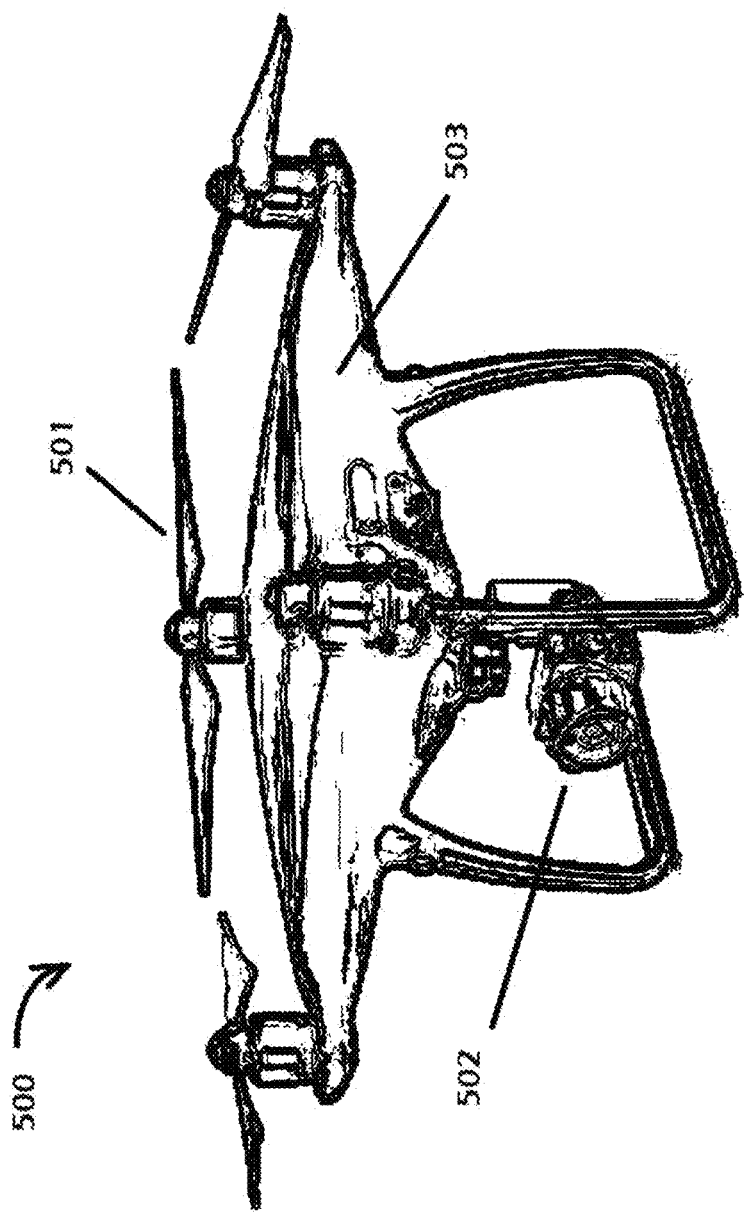
FIG. 5 is a drawing of a prior art quadcopter (drone), product "Phantom 4", with an on-board camera.

FIG. 5 shows a prior art system using a camera 502 mounted on an aerial vehicle (drone) 500, which flies using propellers 501 and determines its location using a GPS and/or an IMU (Inertial Measurement Unit) 503. The drone 500 provides a video recording of what the camera 502 records for use in determining a three-dimensional representation of the terrain where it flies, using a principle known as photogrammetry. This is a computationally complex algorithm that is similar to VSLAM.

Figure 6:
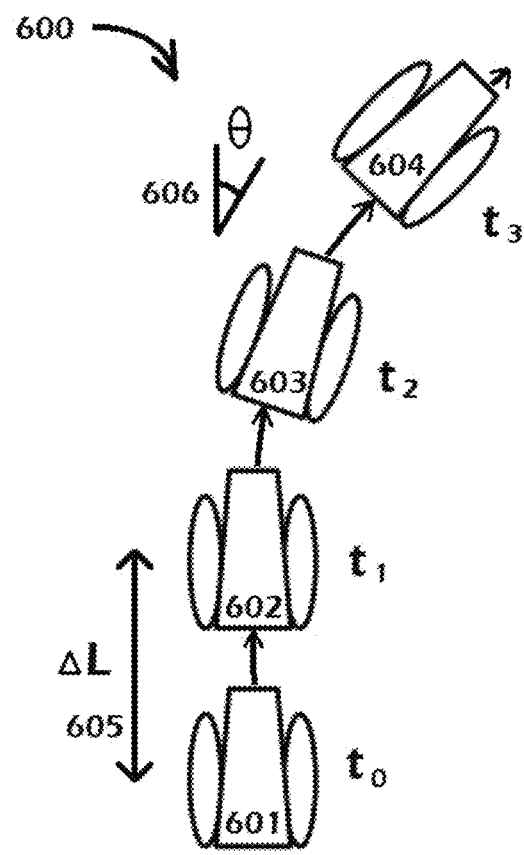
FIG. 6 is an illustration of the prior art technique of navigating by dead reckoning.

FIG. 6 shows a prior art navigation system 600 known as dead reckoning, which is often used in mobile wheeled robots. A robot moves along a trajectory over time. At time t0, the robot is at location 601. At time t1, the robot is at location 602, at time t2, it is at location 603. Finally, at time t4, it is at location 604. The robot advances a distance $\Delta L$ 605 during time from t0 to t1. The robot may turn an angle $\theta$ 606 between time periods. Suppose that the robot starts at a known location (X0, Y0) at time t0. By recording the distance traveled and the angle turned between time t0 and t1, the location (X1, Y1) at time t1 can be determined. The distance and angle are often measured using wheel encoders, as the amount of distance traveled by each wheel is proportional to the angle of rotation of each wheel, ignoring wheel slippage.

Figure 7:
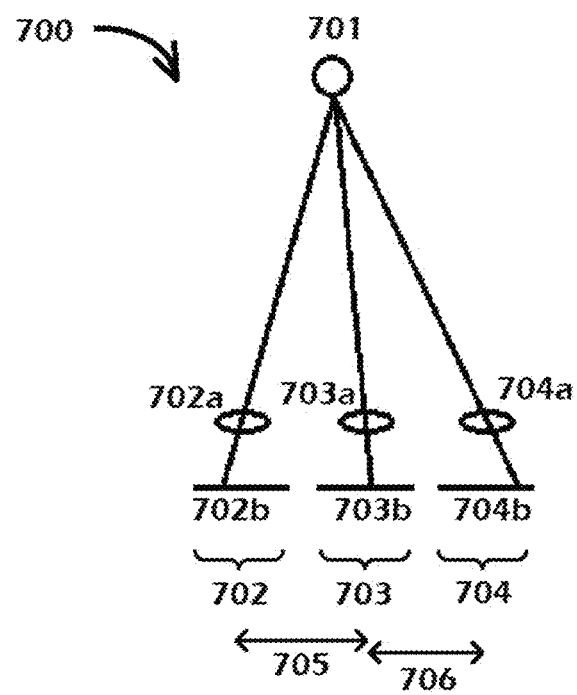
FIG. 7 is an illustration of the prior art technique of multi baseline stereo.

FIG. 7 illustrates a prior art technique known as multi-baseline stereo, which is a variation of stereo processing.

The measurement geometry 700 consists of multiple camera locations 702, 703, and 704, which can be from multiple cameras at different locations or from a single camera moved to multiple locations. An object to be measured 701 is imaged by the three cameras, 702, 703, and 704, whose locations are identified by the optical center of their imaging lenses, 702a, 703a, and 704a. A point on object 701 is imaged onto the image sensors of each camera at a different location 702b, 703b, and 704b, according to the camera location. The cameras in the illustration 700 are spaced apart by distances 705 and 706. Cameras 702 and 703 are spaced apart by distance 705, while cameras 703 and 704 are spaced apart by distance 706. These distances 705 and 706 are known as baselines. A stereo camera consists of two cameras, such as 702 and 703 spaced apart by a baseline such as 705. A multi-baseline camera system consists of two or more stereo systems, such as 702/703 and 703/704. An enhanced representation of the three-dimensional data of the object 701 is possible using a multi-baseline stereo system compared to a stereo system.

Figure 8:
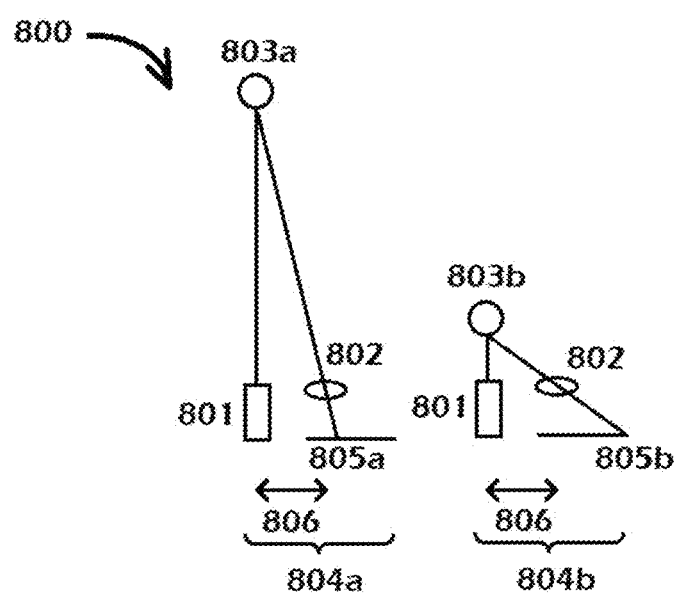
FIG. 8 is an illustration of the operation of a laser stripe rangefinder.

FIG. 8 illustrates a prior art technique known as triangulation that is used to capture three-dimensional data using a single stationary camera. A triangulation system 800 measures the three-dimensional structure of an object 803a using a camera consisting of lens 802, imager 805a, and laser line generator 801 spaced at a fixed offset 806, called a baseline, from the camera lens 802. A laser line is projected from the line generator 801 toward the object 803. Reflections from the object 803a traverse through the imaging lens 802 and form an image 805a on the imager of the camera. If the object 803a is far away from the camera lens 802, this is depicted by the geometry of 804a. If the object 803b is closer to the camera lens 802, this is depicted by the geometry of 804b. This causes the image of the object 803b to be at location 805b on the imager. Location 805b from a nearby object 803b is farther away from the optical center of lens 802 than location 805a from a faraway object 803a. The distance from the optical center to the object reflection 805a/805b is called the disparity and is a measurement of distance to the object 803a/803b. Disparity can be calculated for points reflected along the laser line, which yields a distance measurement for points along a line. This is what is called a 2½ D camera or a linear 3D camera and can compute three-dimensional data of an object from a single vantage point along a line of the laser stripe.

Figure 9:
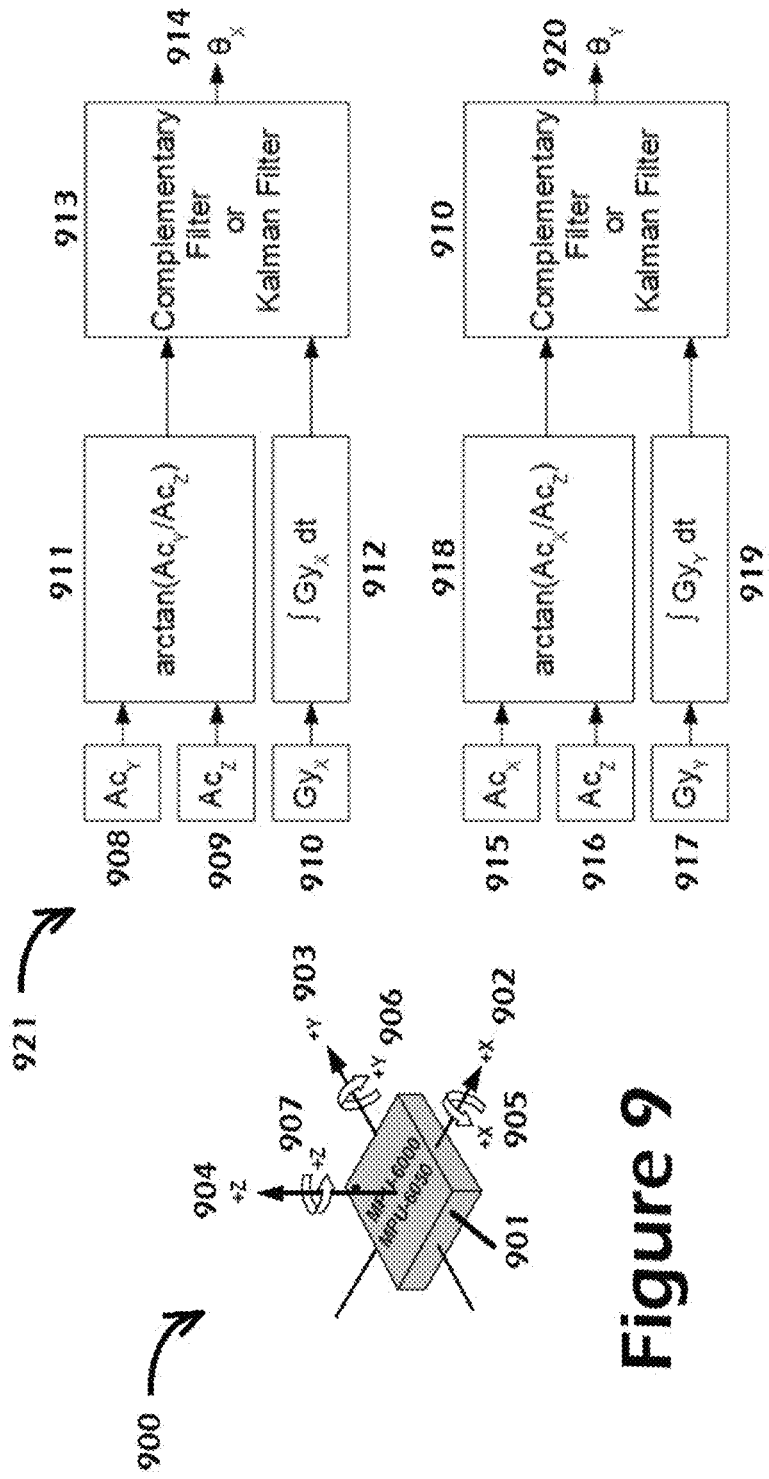
FIG. 9 is a drawing of the components of an Inertial Measurement Unit (IMU).

FIG. 9 shows the prior art operation of an Inertial Measurement Unit (IMU). IMU system 900 consists of an IMU device 901 that contains a three-axis accelerometer and a three-axis gyroscope. The accelerometer measures the acceleration, typically due to gravity, but also due to motion of the IMU 901 through space. The accelerometer measures acceleration in the vertical (Z) direction 904, typically the direction (or opposite direction) of Earth's gravity, the acceleration in the lateral (X) direction 902, and in a direction (Y) 903. The gyroscope measures the rate of rotation of the IMU 901 through space. It measures the rotation around the X axis 905, Y axis 906, and Z axis 907. Block diagram 921 shows the operation of an IMU system 900 to determine the orientation angle 9X 914 and orientation angle GY 920 from the accelerometer and gyroscope data. The yaw orientation (GZ, not shown) cannot be determined uniquely from accelerometer and gyroscope data, but requires additional information, such as from a magnetic compass. An estimate of the orientation angle 914 can be computed by accelerometer components AcY 908 and AcZ 909 using an arctangent (arctan) operation 911. An estimate of the orientation angle 914 can also be computed by integrating the gyroscope component GyX 910. The accelerometer estimate is accurate when the IMU 901 is not moving, but becomes inaccurate when IMU 901 is moving, where acceleration due to motion becomes significant compared to the acceleration due to gravity. The gyroscope estimate is more accurate when the IMU 901 is rotating, but suffers from static drift due to measurement error, which creates increasingly inaccurate results over time. The measurement result 914 combines the results from the accelerometer and gyroscope using a Complementary Filter or Kalman Filter 913. This typically uses the low frequency signal from the accelerometer and high frequency signal from the gyroscope to compute the best result. In a similar way, the other angle 920 is computed from components 915, 916, and 917, processed with blocks 918, 919, and 910.

Figure 10:
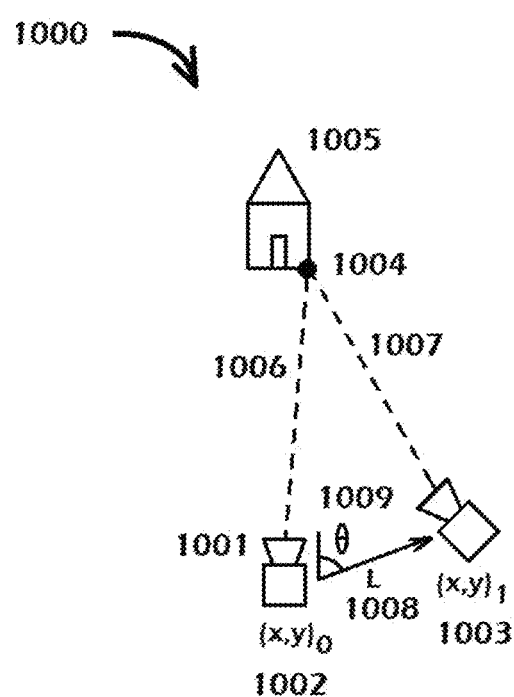
FIG. 10 is an illustration of the principle of Visual Simultaneous Location and Mapping (VSLAM).

FIG. 10 shows a simplified prior art explanation of VSLAM (Visual Simultaneous Location And Mapping). VSLAM system 1000 consists of a camera 1001, often a 3D camera, located at multiple locations 1002 and 1003 based on camera motion, such as by being mounted on a mobile platform. Camera 1001 takes pictures of a scene which may include objects 1005. Locations of distinct points 1004 in the scene are recorded at the various locations of the camera over time. Computations are performed to determine the locations of the camera 1002 and 1003 that best explain the location of distinct points 1004 in the image. If an initial location 1002 (x,y)0 is known, the calculated distance change L 1008 and orientation change θ 1009 can be used to determine the new location 1003 (x,y)1 of the camera.

Figure 11:
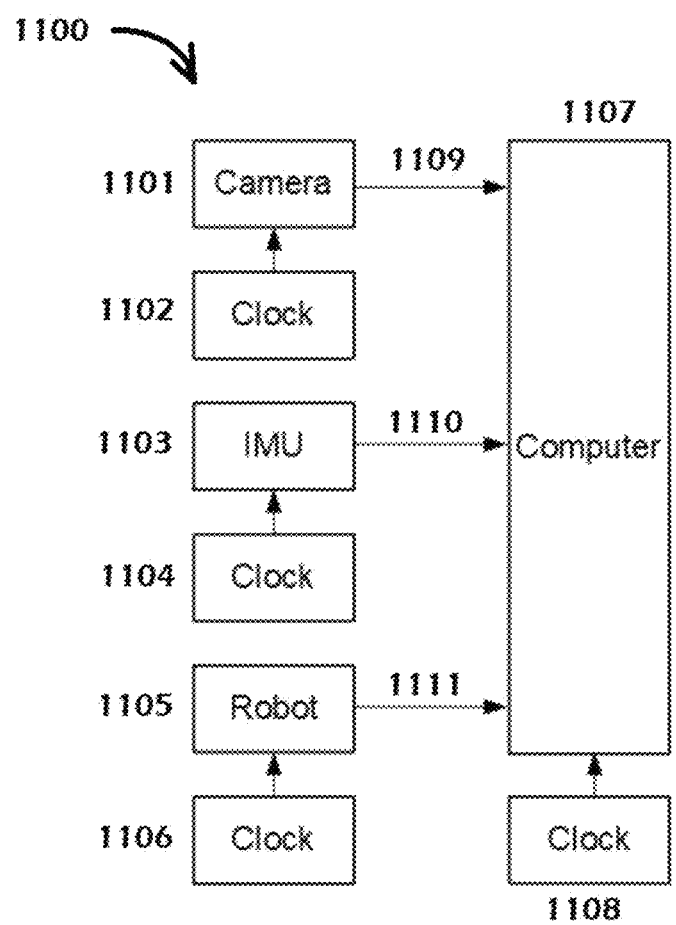
FIG. 11 is block diagram of a prior art measurement system.

FIG. 11 shows a block diagram of a prior art method of determining the location of objects using a mobile camera in a robotic application. System 1100 consists of a camera 1101, which takes pictures 1109 sent to computer 1107 according to the timing of a clock 1102 that sets its frame rate. An IMU 1103 sends relative position and orientation data 1110 to the computer 1107 at a rate determined by clock 1104. A robot 1105 sends its current position 1111 or the position of the camera 1101 mounted to the robot 1105 to computer 1107 at a rate determined by clock 1106. The computer 1107 uses a clock 1108. Clocks 1102, 1104, 1106, and 1108 are generally not synchronized. Techniques such as NTP (Network Time Protocol) exist to approximately synchronize clocks 1102, 1104, 1106, and 1108. Synchronization of events from various sources 1101, 1103, and 1105 to computer 1107 complicates algorithms designed to determine the camera's location. Successful prior art systems tend to have the camera 1101, IMU 1103 and computer 1107 co-located and synchronized to a single clock due to close connection to an embedded computer. Such systems as the Google Tango Project and iPhone panorama capture use this technique.

FIG. 12 shows a prior art description of a Camera Matrix. Camera Matrix 1200 determines pixel coordinates (u,v) 1202 when imaging a three-dimensional point (X,Y,Z) 1205. A scale factor s 1201, intrinsic matrix 1203, which contains focal lengths fx and fy and image center cx and cy, and extrinsic matrix 1204, which contains rotation components r and translation components t, are used to compute the pixel coordinates 1202 using linear algebra. The intrinsic matrix 1203 and s 1201 define the geometry of the camera itself (focal length and image center) while the extrinsic matrix 1204 defines the location and orientation r of the camera in space. The intrinsic matrix is typically fixed, due to the use of a fixed focus camera. The extrinsic matrix is fixed in a fixed camera scenario and changes in a mobile camera scenario.

Figure 13:
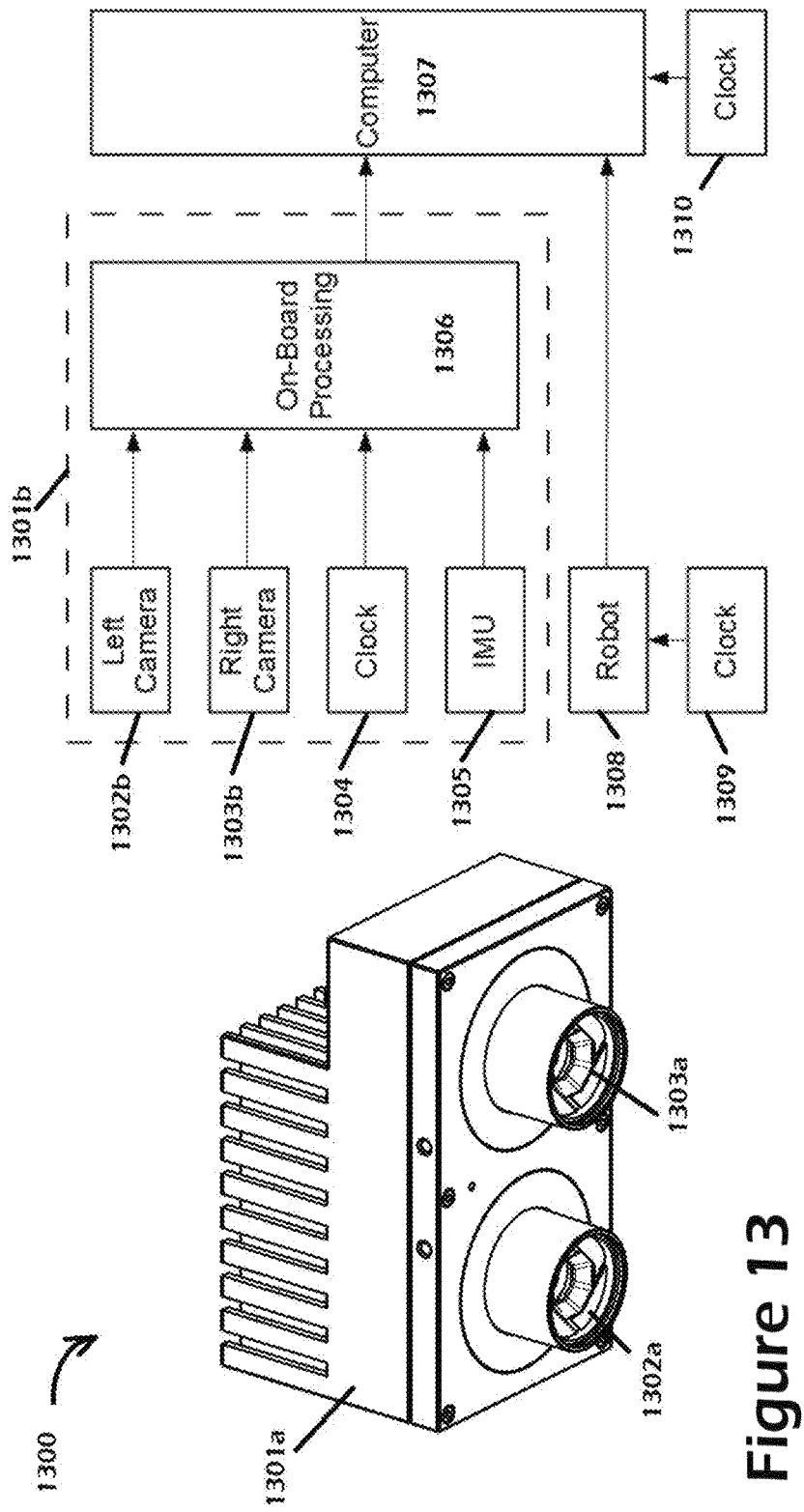
FIG. 13 shows a physical layout and block diagram of a prior art 3D camera by Roboception "rc_visard".

FIG. 13 shows a prior art camera that is the closest known implementation to the present invention. The camera 1300 is made by Roboception and is called "rc_visard". It is a stereo camera consisting of a left camera 1302a and a right camera 1303a. It contains an on-board processing unit 1301a that generates significant heat, requiring the camera 1300 to contain a sizeable heat sink. The camera system block diagram (believed to be accurate based on the present inventors understanding of the camera's documentation) 1301b shows the left camera 1302b and right camera 1303b sending data to the on-board processing unit 1306. Also transmitted is a clock signal 1304 and IMU data 1305. The on-board processing unit 1306 uses VSLAM techniques integrated with the IMU to determine the location of the camera over time. Because the processing is closely coupled, the computation of location is tractable. The resulting three-dimensional model of objects is transmitted to the external computer 1307. A robot 1308 may be controlled by the computer 1307 in response to data from the camera 1301b. Latency from the camera to the robot, due to the differing clocks 1304, 1309, and 1310 in the system can still be problematic. There are accuracy challenges with a system of this sort, since VSLAM and an IMU dead reckoning are relative measurement methods and require ground truth initialization (such as from calibration) to determine absolute location. These techniques suffer from position drift, leading to inaccurate position over time.

Figure 14:
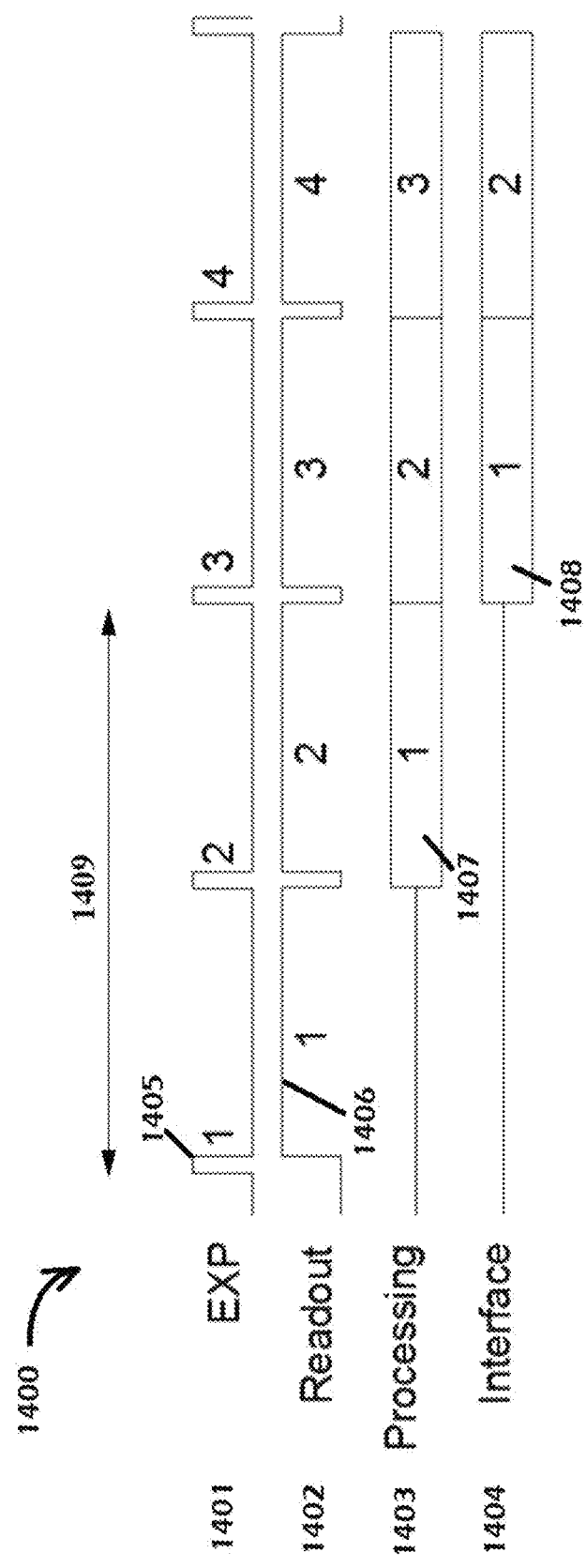
FIG. 14 shows a timing diagram for a USB camera readout.

FIG. 14 shows a prior art timing chart of the sequence of events during the taking of an electronic picture. Timing diagram 1400 shows an exposure signal 1401 that pulses high 1405 every time a picture is taken and indicates the exposure of the imager to light. Subsequent to exposure is a readout operation, which is shown schematically by Readout 1402. Specifically, after exposure 1401 a readout event 1406 occurs as pixel data is transferred from the imager to a processor's memory. Upon the receipt of the last pixel during readout 1406, the entire image is in memory. Typically processing begins at this point, which is shown schematically by Processing 1403. Specifically, after the readout 1406, processing 1407 of the first frame occurs. After processing has been completed, the data is sent out the interface, such as USB or Ethernet, to an external computer for further processing. This is shown schematically as Interface 1404 and specifically, the first frame is transmitted as 1408. Note that there is a significant time duration between the first exposure 1405 and the transmission of the first image 1408. This is called latency 1409 and can cause problems when trying to time synchronize camera image events to other events, such as from an IMU, which has relatively short latency in comparison.

Figure 15:
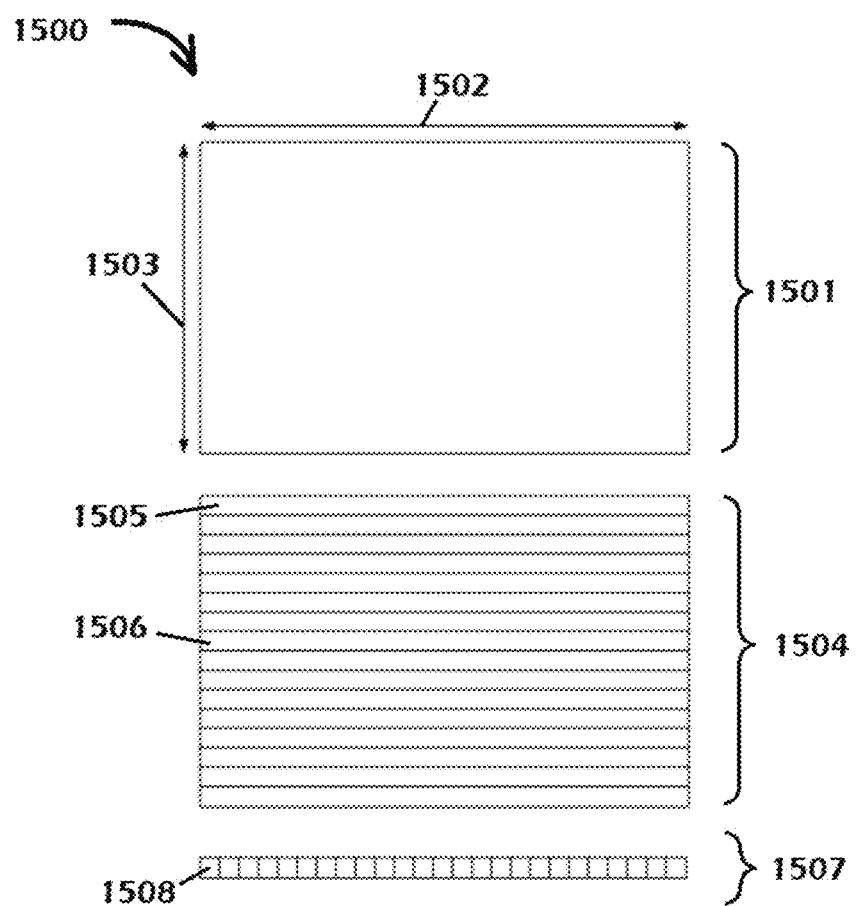
FIG. 15 shows the method of storing an image in a computer.

FIG. 15 shows a prior art drawing of how an image is stored in memory. Illustration 1500 shows a two-dimensional image 1501 of width 1502 pixels by height 1503 pixels stored in memory. Image pixel data is stored row by row 1505, 1506 in memory 1504. The first row 1505 is stored at the beginning of the memory buffer and is the first row to be read from the imager during the readout period. Each row 1507 consists of pixels 1508, which are typically bytes that indicate the brightness and/or color of the image at that location. The entire image 1501, is therefore a sequence of numbers corresponding to the intensity of light at a certain location, quantized to typically an 8-bit value. The image is therefore stored as a two-dimensional integer matrix in memory. Some image transmission methods send the raw image without any metadata that further describes the image. In these cases, the format of the data, such as being encoded as 8 bits per pixel and of a certain resolution width 1502 and height 1503 are assumed when receiving the data.

Figure 16:
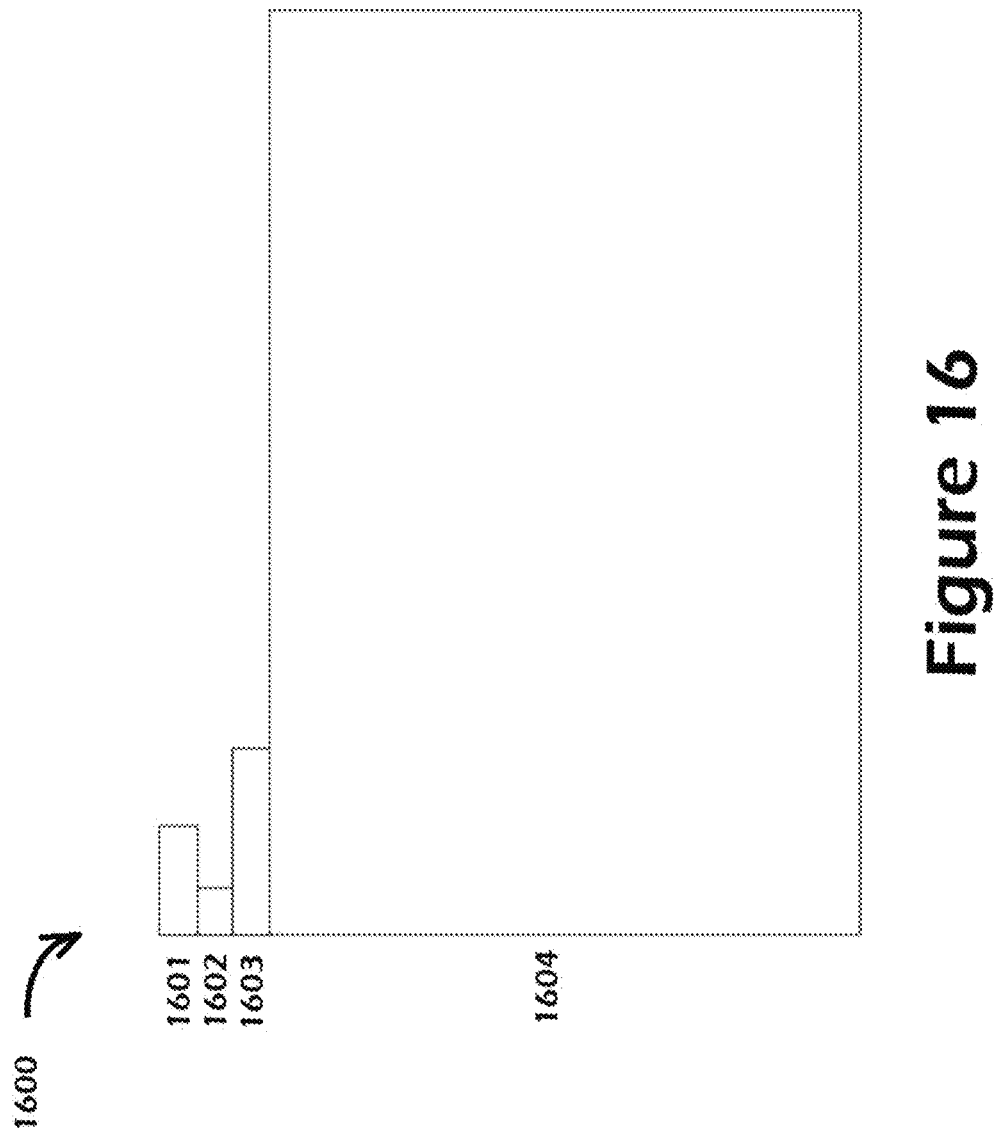
FIG. 16 shows the method of storing a structure that contains an image and metadata.

FIG. 16 shows a prior art drawing of how an image with metadata may be stored in memory. Specifically, data structure 1600 consists of an image 1604 stored in memory as a two-dimensional integer matrix. It is accompanied by metadata 1601, 1602, and 1603, which may be single numbers, character strings, or matrix data. Such examples may include the time when the image was taken, the image dimensions, or other pertinent image data. A bitmap file BMP is an example of a data structure that contains an image and metadata. Some image transmission methods transmit metadata along with an image.

The inventor has recognized the shortcomings of the prior art in mobile camera developing systems that capture three-dimensional representations of objects and scenes. In particular, the challenge of prior art systems to rapidly and accurately know the location of a mobile camera while capturing images is evident. Mobile systems must stop to take a picture or tightly embed significant amounts of processing locally in order to provide accurate camera position information. It is desirable to have a camera system that knows where it is in space during the exposure of each picture and to provide this information easily to an external computer system. This will enable the rapid and accurate measurement of three-dimensional data from a mobile camera system, thus improving the accuracy and completeness of the data over a fixed camera system. Furthermore, it enables the capture of three-dimensional information using a single two-dimensional camera or a 2½ D camera rather than requiring a 3D camera for capturing the information. Such benefits should be evident from the description of the present invention in more detail.

Figure 17:
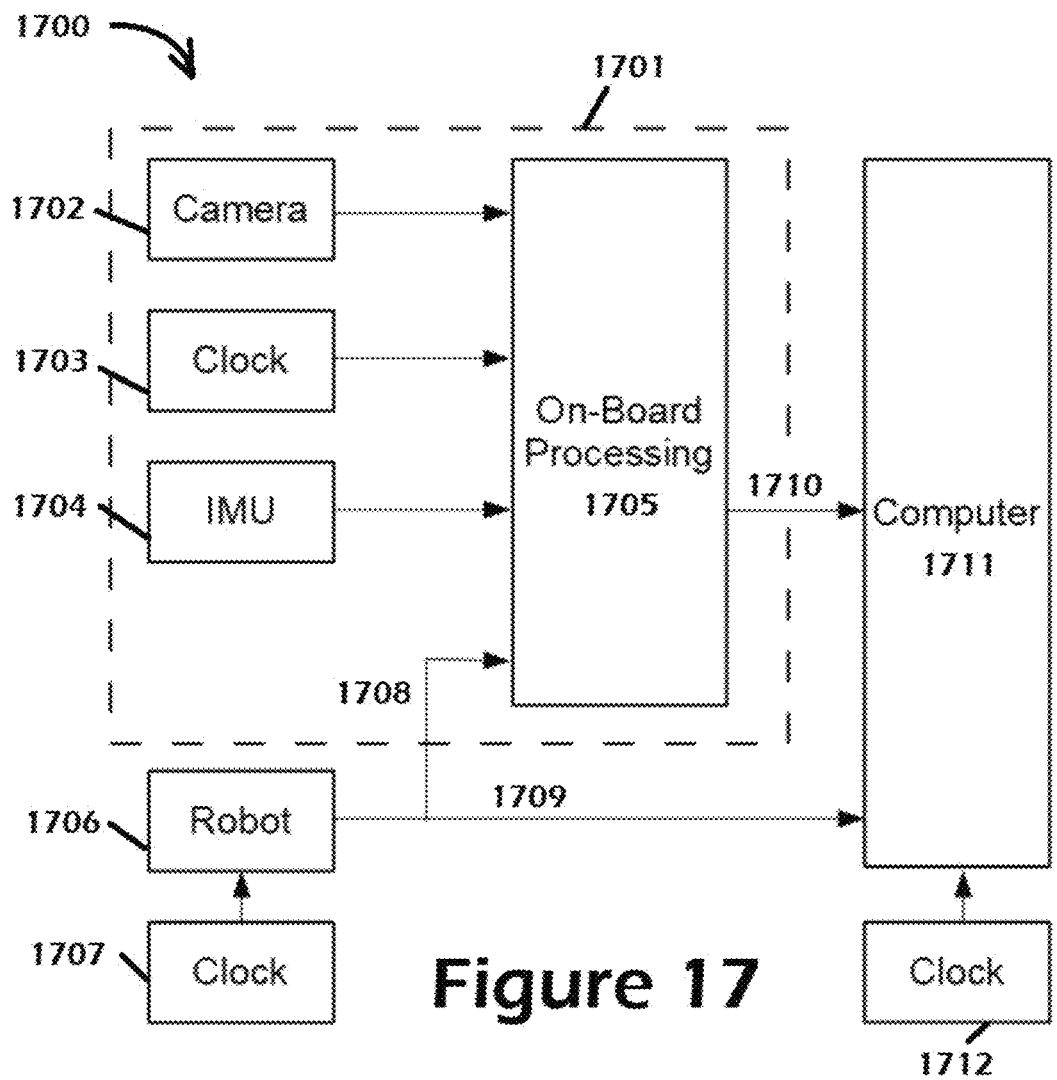
FIG. 17 shows a block diagram of an exemplary camera system of the current invention.

FIG. 17 shows a block diagram of an exemplary system according to the present invention. Mobile camera system 1700 consists of a mobile camera 1701 which transmits information 1710 to an external computer 1711 which may be remote from the camera and not necessarily tightly embedded. Specifically, the computer's clock 1712 need not be synchronized with the camera's clock 1703. A robotic system 1706, upon which the mobile camera 1701 is mounted, is connected to computer 1711 and has its own clock 1707, which need not be synchronized with either the computer's clock 1712 or camera's clock 1703.

The camera system 1701 consists of a camera 1702, which is typically a 2D camera, but may be a 2½ D camera or a 3D camera, a clock 1703, and an optional IMU 1704. On-board processor 1705 receives camera data from camera 1702, IMU data from IMU 1704 and time data from clock 1703. Preferentially it also receives robot position data 1708 from robot 1706, a copy 1709 of which is also sent to the computer 1711. The processing unit 1705, using instructions and data contained therein, computes the best estimated location of the camera using robot positioning data 1708 and IMU data 1704. This data is recorded or interpolated during the time instant of exposure 1405 (from FIG. 14). If two tuples of coordinates, for example from the robot 1708, are used that bracket (precede and follow) the camera exposure moment, then interpolation may be used to determine the location of the camera during the exposure time. If velocity and/or acceleration of the mobile apparatus (such as the robotic system 1706) is available, for example via the IMU 1704, then a single tuple of coordinates may be used and the location of the camera during the exposure time can be extrapolated from this data. This data may be embedded in the image structure as metadata 1603 (from FIG. 16), which also may include an image, or embedded directly in the image, such as in the first row of the image 1505 (from FIG. 15) as a numeric representation instead of pixel data in a predetermined format. The position data may be entered into the image or metadata as a Camera Matrix 1200 consisting of an intrinsic matrix 1203, scaling factors 1201 and extrinsic matrix 1204 (from FIG. 12). Transmission of this enhanced image data 1710 is sent to the external computer 1711.

Alternatively, the moment of exposure from the camera 1702 and moment of measurement of data from the position source (such as from the robot 1708 or from the IMU 1704) could be recorded as a time stamp, recording these events in what is often called a trace buffer. Either in the on-board processing unit 1705 or the external computer 1711, the location data can be interpolated to determine the location at the time of exposure 1405. Since time accuracy is important to prevent errors in 3D reconstruction, recording of time from a common clock source, such as from the clock 1703 for the on-board processor is advantageous compared to the method of FIG. 13, which cannot easily record the location from the robot 1308 with the same clock source.

It is now possible for the external computer 1711 to determine three-dimensional data of a measured object using this technique. For example, multi-baseline stereo can be implemented by determining the baseline from computing the difference between camera locations for subsequent or arbitrary images by subtracting the translation vectors from the extrinsic matrix. A more complete method that is typically used in stereo and multi-baseline stereo techniques is to determine a projection matrix through a process called rectification, where the second image is transformed using the two camera matrices to be parallel to the first image so that disparity (offsets of common points in both images) can be performed along the same row in the image. This common technique can be performed in real-time using the present invention by rectifying subsequent images and computing disparity for each pixel in the first image, yielding what is called a depth image. The conversion from the camera-centric depth image computed by stereo disparity to real-world coordinates is also made possible by the inclusion of the Camera Matrix in each image set. So a real-time computation of three-dimensional data from multiple sets of images captured by a mobile camera (also known as a fused point cloud) is possible with low computational overhead. The ability of remote computation of the three-dimensional data using an annotated camera stream allows the camera to be small and low power, enabling new applications compared to a prior art camera system such as the Roboception camera 1300 (FIG. 13).

Once external computer 1711 has determined parameters of objects in the world space, additional data and instructions can cause the computer to issue commands back to robot 1706, causing the robot to move in the world space so that it interacts with (or avoids) the object(s).

Figure 18:
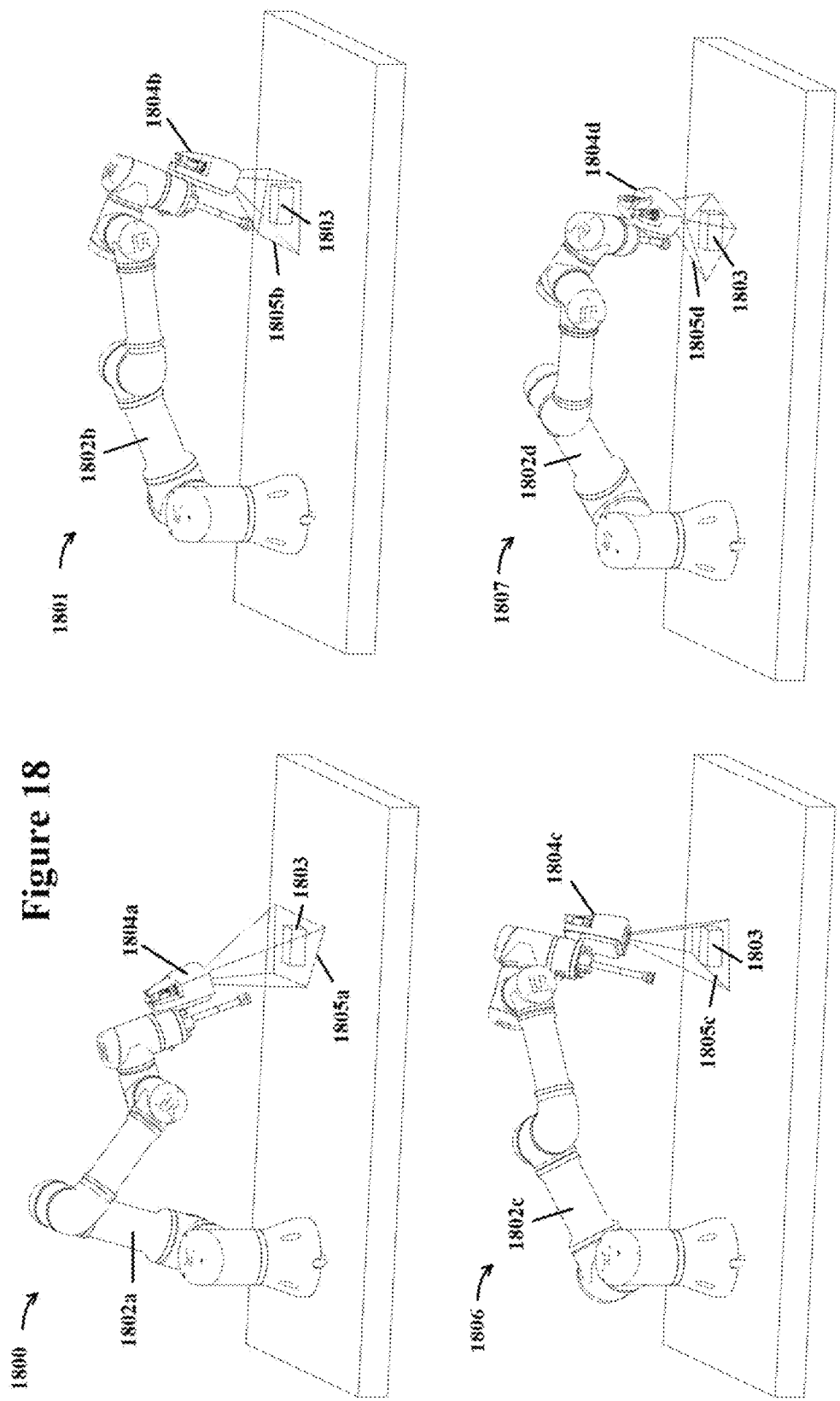
FIG. 18 shows a robot measuring an object using the current invention.

FIG. 18 shows an exemplary use of the present invention in a useful task of scanning an object to determine its three-dimensional characteristics using a Vision Guided Robotic system. This scanning can be part of a task, such as Vision Guided pick and place system. A robotic workcell 1800 at time 1 consists of a robotic arm 1802a with an end-effector mounted camera 1804a imaging an object 1803 on a work surface. The object may be static, such as sitting on a table, or in motion, such as on a conveyor. The camera images a field of view 1805a during this first picture. The robot moves, continuously and rapidly if desired, at time 2 to 1801. The robot may continue to be in motion at this moment in time. The robot, now at 1802b, uses camera at location and orientation 1804b to image the object 1803 again from a new vantage point. It covers a field of view 1805b in this image. The robot can continue to move, if desired. At time 3, shown as 1806, the robot is now at 1802c. The camera is at 1804c and images a field of view 1805c that contains the object 1803. Furthermore, the robot could continue to move. At time 4, shown as 1807, the robot is at 1802d, the camera is at 1804d and images a field of view 1805d that contains object 1803. In real-time if desired, an external computer system can calculate multi-baseline stereo three-dimensional data from subsequent images using the annotated Camera Matrix recorded by the camera using techniques specified in the present invention. The object 1803 can be imaged from multiple sides, illustrated as fields of view 1805a, 1805b, 1805c, 1805d, while the robot is continuously moving, to create a complete three-dimensional model of the object 1803. The object 1803 could also be in motion while this three-dimensional scanning is occurring.

Figure 19:
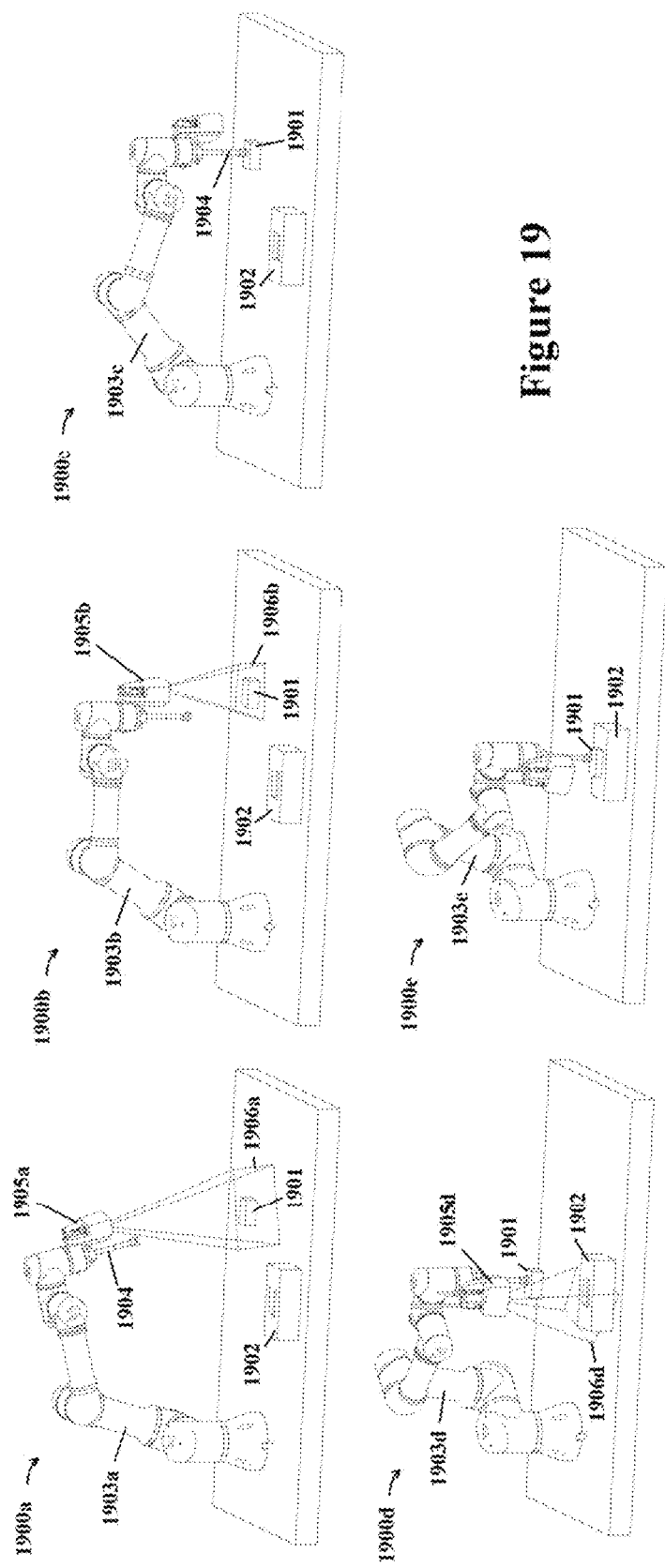
FIG. 19 shows a vision guided robotic pick and place system using the current invention.

FIG. 19 illustrates how such a Vision Guided Robotic system can be used to determine the coordinates and orientation of object 1901 to perform a pick-and-place operation such as is also shown in system 100 (FIG. 1). The object 1901 in FIG. 19 may have been previously scanned to determine its three-dimensional characteristics as shown in FIG. 18, or may be of a size and shape previously known to the system. FIG. 19 illustrates five sequential steps in the vision guided pick and place process. In step 1900a, the robot 1903a is in a first position, known as the pick location, to allow arm mounted camera 1905a with field of view 1906a to view object 1901. The image from the camera is analyzed to determine a trajectory to the object 1901. In step 1900b, the robot has moved toward the object 1901 to location 1903b. The camera, now at location 1905b looks at object 1901 within a field of view 1906b. This second image allows more parameters of the object 1901 to be determined, such as its size, location, and orientation. As the system acquires additional images from different vantage points, it is able to determine more parameters of the object, and/or to refine the accuracy of previously-determined parameters. Based on the continuous sequence of images that are processed, the robot is visually servoed on a trajectory that leads to 1903c when the end effector 1904 to make contact with the object 1901, shown in step 1900c. At step 1900d, the robot is at location 1903d, putting the camera at location 1905d with field of view 1906d, where the camera is able to see the destination (place) location 1902. By processing this image, the 3D location of the place location can be determined to allow the robot to be visually servoed so that the object 1901 is placed at the place location 1902 as shown in step 1900e. Summarizing this operation with reference to FIG. 1, a Vision Guided Robotic system 100 can be used to pick up arbitrary objects 105 from an arbitrary pick zone and placed or stacked into a place zone 106 that can also be arbitrarily located. Neither the pick zone nor the place zone need to be fixtured or defined in a precise location. Since the visual guidance occurs while the robot is moving, this pick and place operation can be performed at high speed without stopping to orient the robot, or defining specific pick and place locations.

Figure 20:
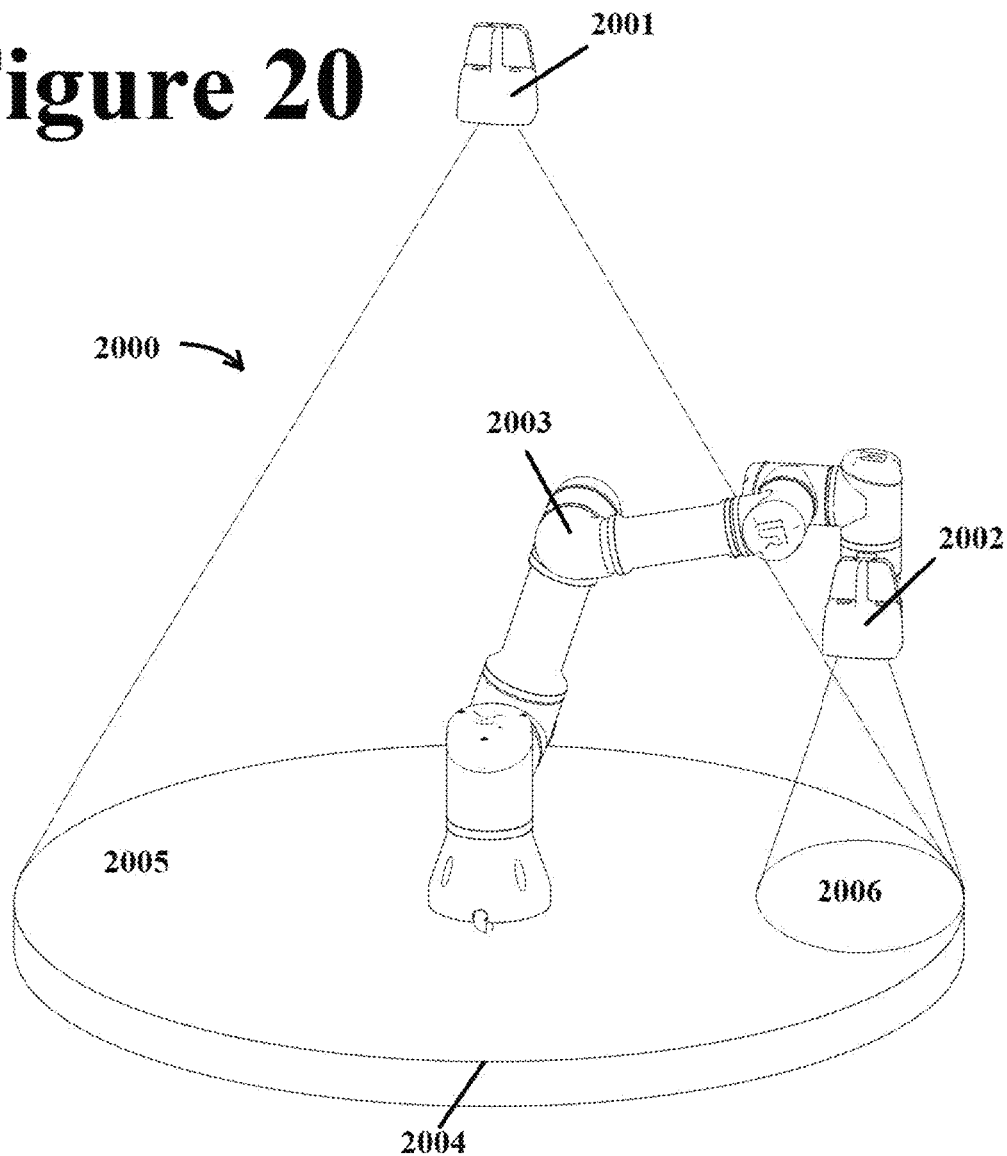
FIG. 20 illustrates the concept of variable resolution using an arm mounted camera.

FIG. 20 illustrates a field of view comparison 2000 between a fixed mounted overhead camera 2001 and a camera 2002 mounted on the end of a robot arm 2003 with a reach circumference 2004. As a simplification, the fields of view of the cameras are shown as circular, but are typically of rectangular extent. The field of view 2006 of the arm mounted camera 2002 is smaller than the field of view 2005 of the overhead camera 2001. But since the camera 2002 is mounted on the robot arm 2003, it can view the entire field of view 2005 by moving the camera 2002 to any location within the reach circumference 2004 of the robot 2003. As a performance comparison, consider the Universal Robots UR3, which has a reach diameter of 1 meter, covering an area of 0.785 m². Assume that the resolution of camera 2002 is 1 megapixel and covers a field of view 2006 of a diameter of 200 mm on the target surface, which covers an area of 0.1256 mm². The resolution of the camera at that distance is 0.2 mm per pixel. The equivalent resolution of this camera 2002, when moved around the reach circumference 2004 of the robot 2003 is the ratio of the reach area to the field of view 2006 of the camera 2002, which is 6.25 megapixel. On the largest reach robot made by Universal Robots, the UR10, which has a reach of 2.6 meters, covering an area of 5.3 m², the equivalent resolution would be 42 megapixel. So one of the benefits of an arm mounted camera is an effective increase of resolution without the usual disadvantages of reduced frame rate, power consumption, cost, size, and computing load. For many industrial tasks, the camera 2002 can be moved by the robot 2003 to an overhead viewing position 2001 to determine the gross location of an object and then servo toward an object with ever increasing resolution on the target. This variable resolution solution provides optimum resolution for the task at hand without the disadvantages of using a high-resolution camera.

The variable resolution provides benefits further down the processing chain as well. Instead of relying on a single fixed camera (which must have resolution great enough to provide the finest detail ever needed for an operation, and which consequently emits large frames that all have great detail, even when the detail is not needed) a mobile camera with a more modest resolution (e.g., 640×480) emits smaller images whose pixel resolution depends on the distance from the camera to the feature of interest. These smaller images place much lighter demands on subsequent processing, such as the development of 3D point clouds. Downstream processing may be of quadratic (or higher) complexity in the number of input pixels, not just linear complexity.

Figure 21:
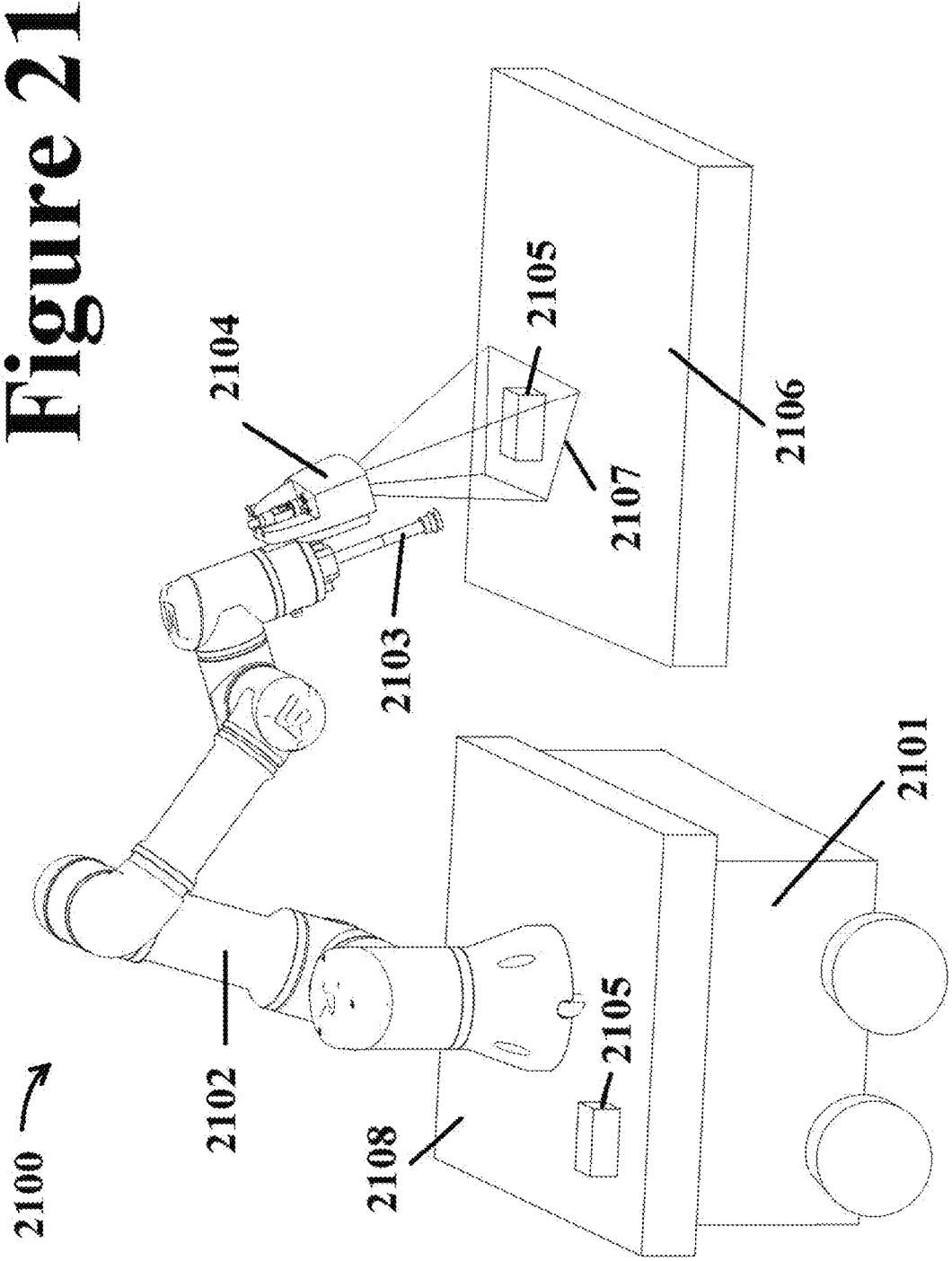
FIG. 21 shows a robot arm on a cart using the current invention.

FIG. 21 illustrates another benefit of an arm mounted Visual Guidance system. Mobile workcell 2100 consists of a mobile robot base 2101, such as made by Mobile Industrial Robots model MiR200, which has a work surface 2108 that can hold objects 2105. Mounted on the work surface 2108 is a robot arm 2102, such as a UR3 made by Universal Robots. An arm mounted camera 2104 is able to detect objects 2105 within a field of view 2107. Parts 2105 can be located either on the mobile base 2108 or on an alternate work surface 2106, which can be stationary, like a table, or moving like a conveyor belt. Robot arm 2102 has an end effector 2103 that is capable of picking up objects 2105. The mobile workcell 2100 is capable of picking objects 2105 off the work surface 2106 and place them on mobile work surface 2108 or vice versa. This enables mobile workcell 2100 to perform a wide variety of tasks in an industrial or retail setting, such as depalletizing, palletizing, inventory stocking or retrieval. Prior art mobile robots require precise docking procedures to align mobile work surface 2108 to a stationary surface 2106 for blind robotic transfer of parts. The Visual Guidance system of mobile workcell 2100 allows it to operate effectively in a less constrained environment, not requiring precise docking. This increases the flexibility of the mobile workcell 2100 considerably over prior art systems.

Note that camera 2104 is mounted to robot arm 2102 near end effector 2103, so its position and orientation closely matches that of the end effector. However, embodiments permit the camera to be mounted elsewhere along robot arm 2102 (i.e., between previous joints) so that the camera may move somewhat independently of the end effector. In this arrangement, the distance from the camera to the end effector may vary as the mobile apparatus changes its position and configuration. Nevertheless, information about the position of the robotic arm's joints can be used to determine the location and orientation of the camera, as well as the location and orientation of the end effector.

Figure 22:
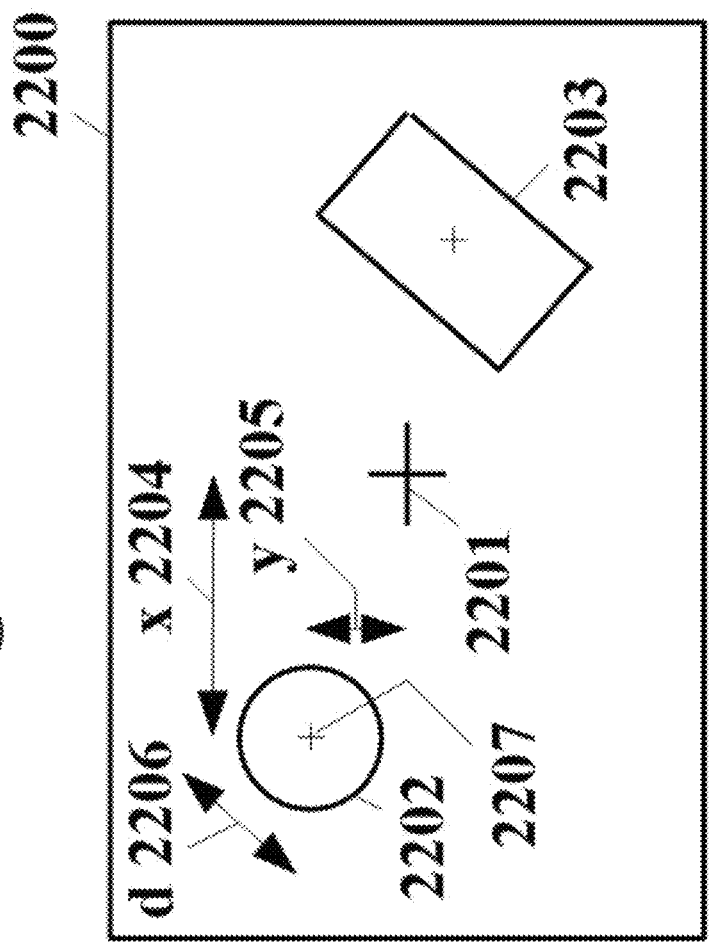
FIG. 22 shows features being extracted from a 2D image.

An important aspect of visual guidance is determining the location of an object in a captured image. FIG. 22 illustrates a captured image 2200 with an image center 2201. An image of a round object 2202 and rectangular object 2203 appear in the image 2200. Using 2D image processing techniques standard in the art, such as thresholding, blob detection, edge detection, feature extraction (such as SIFT, SURF, ORB and the like), and techniques such as the Generalized Hough Transform, location of objects in the image can be determined. Specifically, features in the image such as the centroid of the circular object 2207, indicated by the x offset 2204 and y offset 220 from the image center 2201 and the diameter of the circular object 2206 can be determined. Depending on the location of the camera with respect to the object, different 2D projections of the object are captured in the image.

Figure 23:
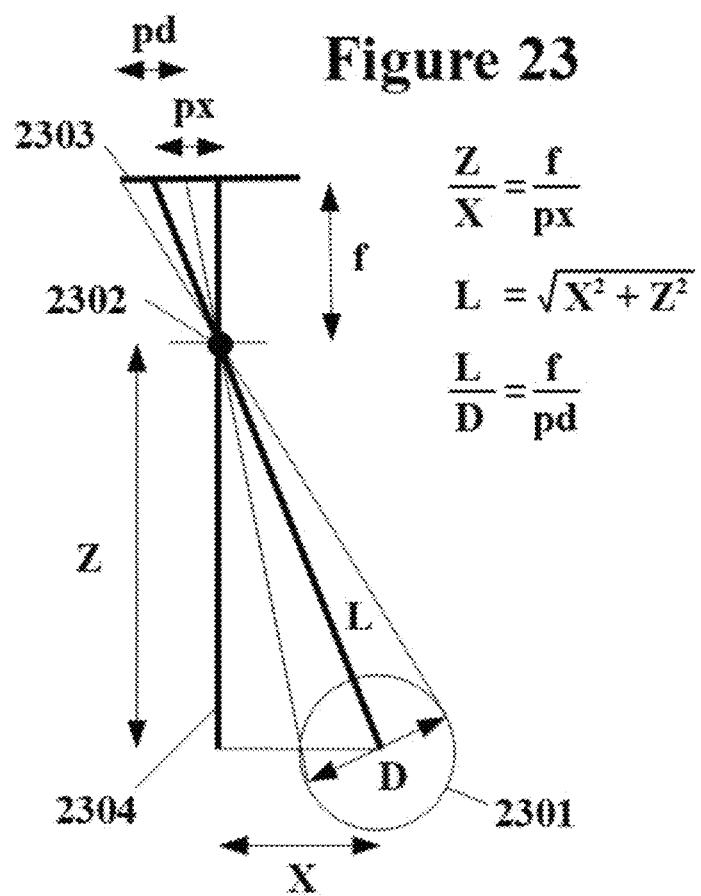
FIG. 23 illustrates how photogrammetry is used to determine the location or size of an object from a single captured image.

Once the location of features has been extracted from one or more 2D images, photogrammetry can be used to determine parameters of a 3D model of the object, including location, orientation, size, velocity, and acceleration of the object. These are called degrees of freedom of the model. Each 2D image of an object extracts a certain number of 2D degrees of freedom that can be used to determine the degrees of freedom of the 3D model of the object. In some cases, a single 2D image is sufficient to determine the remaining unknowns in the 3D model. For example, in FIG. 23, a spherical object 2301 with diameter D and (X,Y,Z) location (only X,Z shown in FIG. 23) is imaged with a camera with lens 2302 of focal length f and imager plane 2303, where (X,Y,Z) are referenced in FIG. 23 with respect to the lens center 2302. The captured image of this spherical object would look like a circle 2202 (FIG. 22). The measured parameters in the image 2200 would be (x,y,d), 2204, 2205, and 2206, respectively. In FIG. 23, two image parameters (x,d) are shown. Known values in the camera would be pixel size p and lens focal length f. There are three unknowns to be solved for: X,Z,D and two measured parameters (in FIG. 23): x,d. If the physical diameter D of the object 2301 is known, then L can be determined, which allows X and Z to be determined. Similarly, if the distance Z from the lens center along the optical axis 2304 to the object 2301 (or instead the distance L from the lens center to the object 2301), then D and X can be determined.

Figure 24:
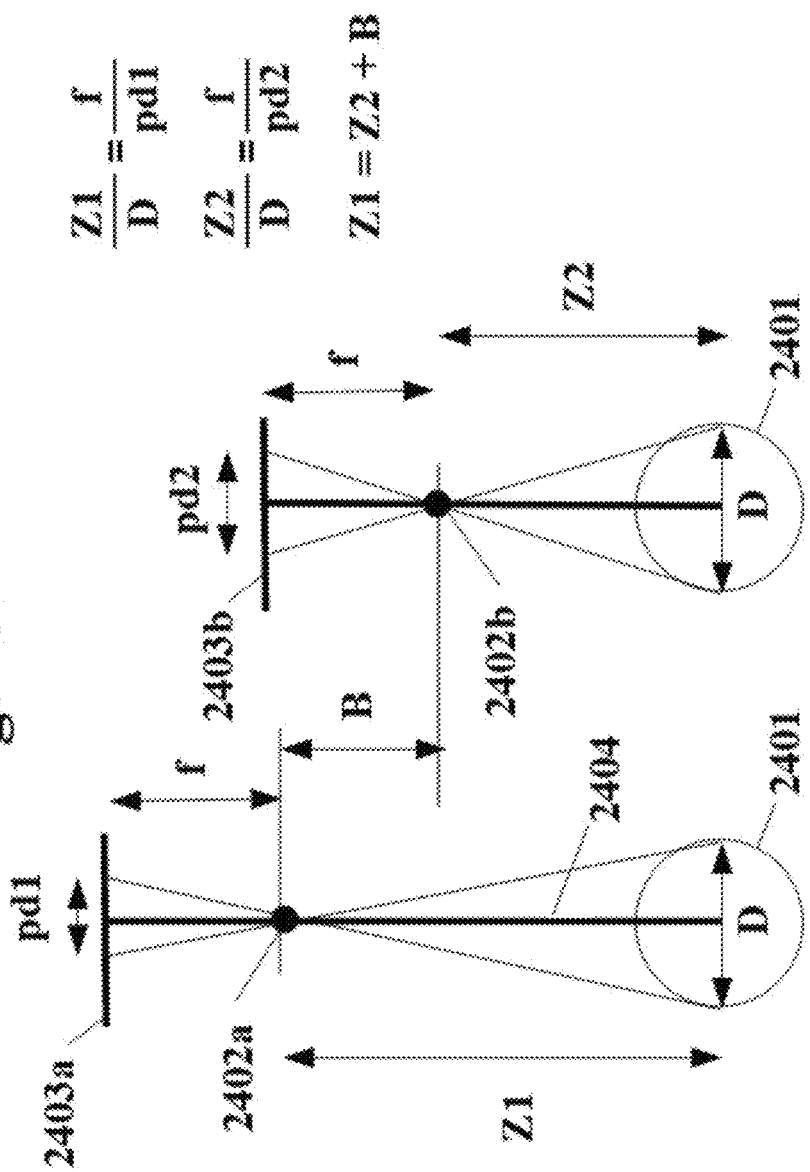
FIG. 24 illustrates how photogrammetry is used to determine the location and size of an object from two captured images.

While in some cases a single image is sufficient to determine the unknown parameters of a 3D model of an object, more typically several images are required. FIG. 24 illustrates a scenario where the distance Z1 to an object 2401 (shown as a sphere) and its diameter D are determined from two pictures taken at two locations. The first picture is taken with a camera at location (of the lens center) 2402a. The image is formed on image plane 2403a with the lens of focal length f. At a subsequent time, another picture is taken when the camera (lens center) is at 2402b. In this simplified example, the object 2401 is located along the optical axis 2402, but those skilled in the art can conceive of how a combination of equations shown in FIG. 24 and FIG. 23 would handle the case of an object off center in the image. The projected diameter of the object 2401 in the first image is pd1, where p is the pixel size and d1 is the diameter of the image of the object in pixels. Similarly, in the second image the diameter is measured as pd2. The physical diameter D of the object 2401 is unknown as is the distance Z (Z1 or Z2) to the object. However, the distance between the two measurements was controlled by the mobile apparatus (such as a robot arm) that the camera is mounted to, so the movement distance B is known. There are sufficient equations as shown in FIG. 24 to solve for D and Z1 (and therefore Z2). In this case, two images allow for four degrees of freedom (X,Y,Z,D) to be determined.

More complex scenarios involving objects off center in the image, objects moving with constant velocity, objects moving with constant acceleration, or multiple objects in the field of view can be solved with more general equations. In particular, algorithms such as Least Squares Regression and the RANSAC (RANdom SAmple Consensus) can be used to determine arbitrarily complex model parameters from a sequence of measurements from captured images. Capturing more images than necessary to meet the minimum number to determine the unknown degrees of freedom of the model can be used to determine error bounds of the measured parameters and/or to reduce the variance of the measured parameters.

Figure 25:
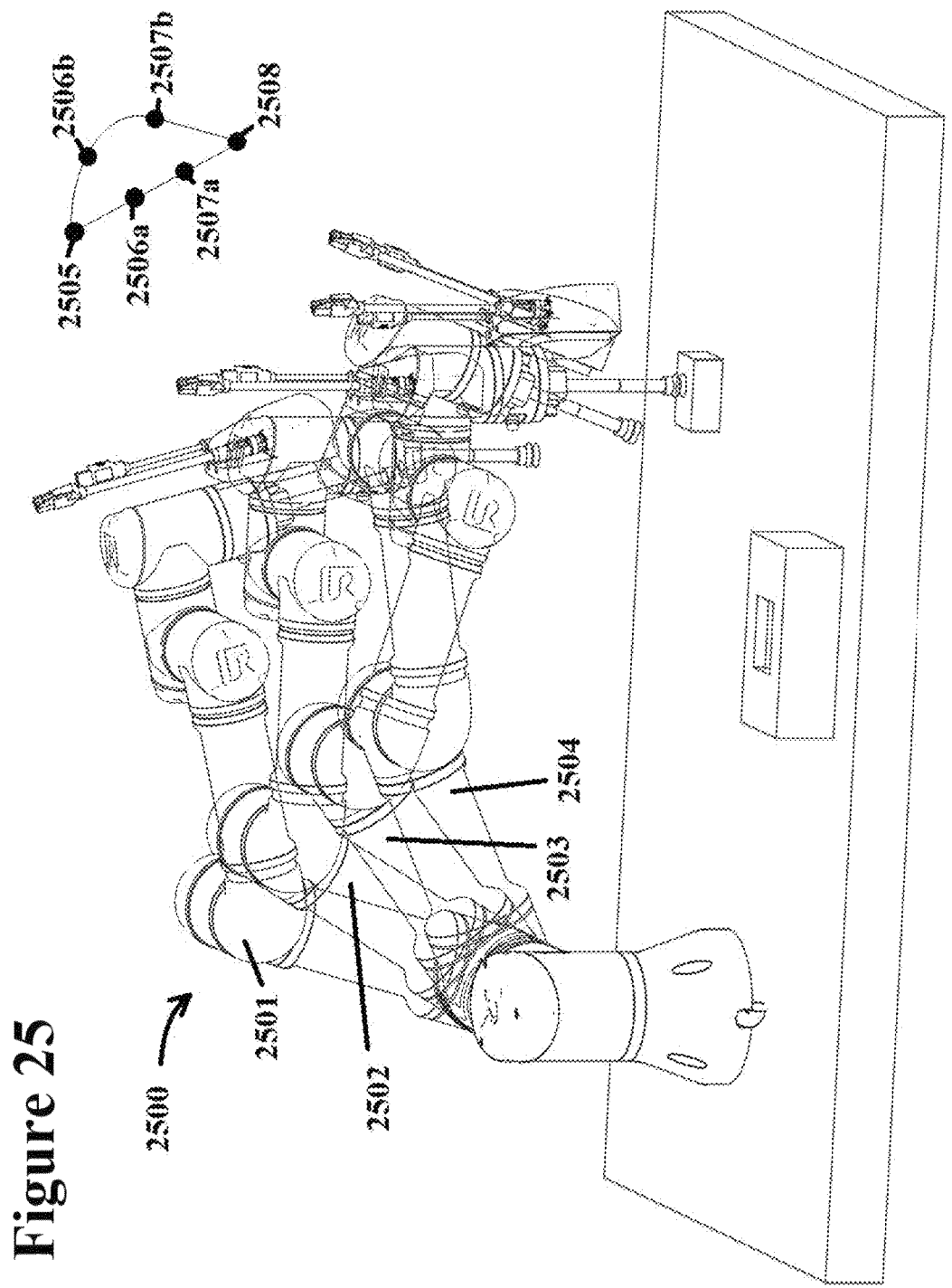
FIG. 25 illustrates a nonlinear trajectory to optimize the location of captured images for visual servoing.

Depending on the parameters of the model that are unknown, limits may be placed on the location of the camera in subsequent measurements to provide useful information. For example, in FIG. 24, if the camera doesn't move (i.e. if B=0) then the model parameters cannot be obtained (except in the case where either the distance Z or diameter D are known). If the object is moving, for example, the camera needs to move between captured frames in order to determine the location, size, and speed of an object. If the object size is known, this is not required. But just moving the camera may not be not sufficient. Under the described circumstances, if the camera is moved at a constant velocity, and neither the speed, size, or distance to the object are known, the model parameters cannot be solved. Some nonuniformity in the camera location in subsequent images is required. For this reason, straight paths toward the object during visual servoing may not be ideal. FIG. 25 shows an example of different trajectories that may be advantageous when implementing visual servoing to determine the values of unknown parameters in a 3D model of an object. A sequence of robot motions 2500, consisting of 2501, 2502, 2503, and 2504 move the end effector toward the object. The inset in the diagram illustrates in 2 dimensions (for clarity) the difference between a uniform, straight line path (2505, 2506a, 2507a, 2508) and a curved path (2505, 2506b, 2507b, 2508) to the object. Although the straight path is the shortest distance from 2505 to 2508, the curved path through 2506b and 2507b may allow the system to acquire or refine more information about an object in the world space—essentially trading efficiency in movement for increased knowledge about the world.

Figure 26:
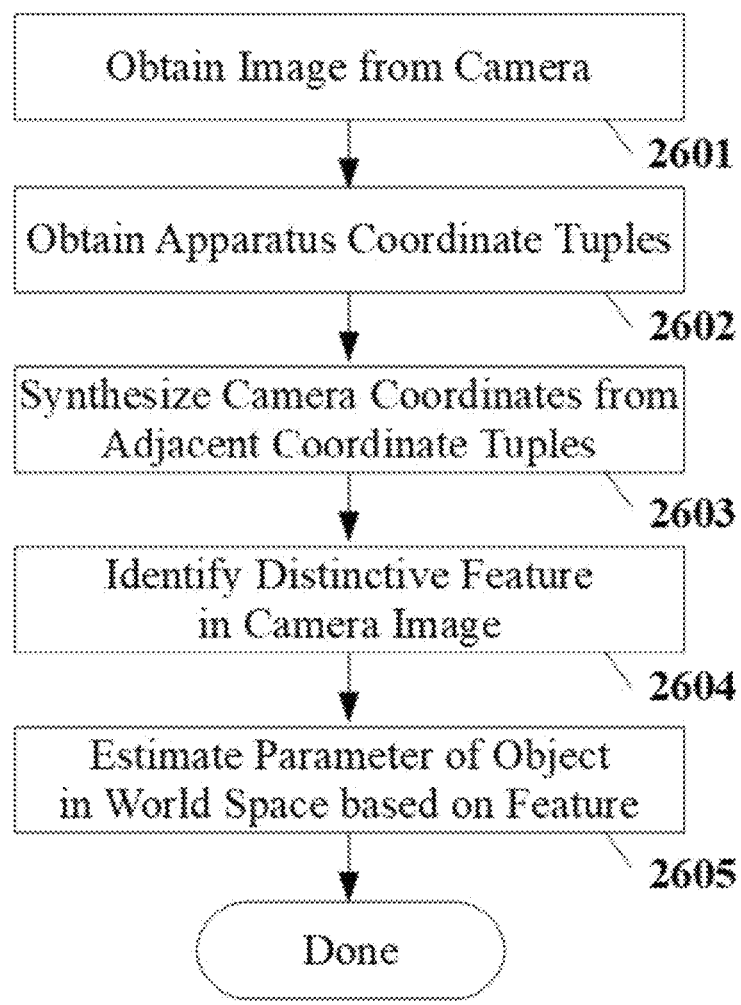
FIG. 26 is a flowchart illustrating the steps in the exemplary embodiment.

FIG. 26 shows a flowchart of the steps in the exemplary embodiment. At step 2601, an image is obtained from a camera at an exposure time. At step 2602, coordinate tuples (typically two sets) from the mobile apparatus are obtained that bracket (precede and follow) the exposure time. If velocity and/or acceleration of the mobile apparatus is measured (for example from a robot or from an IMU), a single coordinate tuple is sufficient. At step 2603, the location of the camera (the camera coordinates) are synthesized (interpolated, extrapolated, etc.) from the measured coordinate tuples. At step 2604, distinctive feature (or features) are identified and located in the camera image. These correspond to features on the target object. In step 2605, one or more parameters of the target object in the world space (3D space) are computed. Typically this is performed using photogrammetry using features extracted from one or more images to determine the parameters of a 3D model of the object. This flowchart is sufficient to determine some parameters of the model of the object. Furthermore, the mobile apparatus (such as a robot) may be commanded to move in response to the knowledge of the 3D model parameters. For example, the apparatus (such as a robot arm) may move to cause the end effector to contact the object, for example to pick it up. Or the apparatus may be moved to avoid the object, so that the robot does not disturb it while performing another operation. The sequence of gathering pictures and altering the trajectory of the apparatus may happen continuously in what is called visual servoing. Knowledge of the location of the camera at each captured frame is vital to accurate measurement of the 3D model of the target object, particularly when the camera is moving. Being able to obtain an accurate 3D model of the object while moving is advantageous, providing higher speed visual servoing in scenarios such as Visual Guided robot pick and place.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components. Some responsibilities of a processing system may be delegated to logically or even physically-separated processors which coordinate their activities via a communication channel. Thus, a "processor" or "programmable control system" may comprise two or more cooperating subsystems which together perform the acts attributed to the overall processor or programmable control system.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

Systems implementing an embodiment of the invention can take a variety of forms. For example, one system may include a mobile apparatus having an effector capable of moving about a world space, a camera fixed to a camera position on the mobile apparatus so that the camera moves when the mobile apparatus moves; and a programmable control system coupled to the mobile apparatus and to the camera, containing data and instructions to cause the programmable control system to perform operations including obtaining a first image from the camera at a first exposure time while the camera is in a first camera location in the world space, obtaining two coordinate tuples from the mobile apparatus at two different acquisition times, each of the two coordinate tuples sufficient to compute a camera location in the world space at a corresponding acquisition time, synthesizing an estimated coordinate tuple from the two coordinate tuples, said estimated coordinate tuple corresponding to a time between the two different acquisition times, said estimated coordinate tuple approximating the first camera location, identifying a distinctive feature in the first image; and estimating a parameter of an object in the world space based on the distinctive feature.

The foregoing system might also include software to direct the mobile apparatus to move the effector relative to the object—for example, to move the effector toward, away from, or adjacent to the object.

In many systems where an embodiment is used, the camera will be in motion at the first exposure time.

Systems can deduce parameters of a target object such as the size of the object, the shape of the object, the location of the object in the world space, the orientation of the object in the world space, the velocity of the object through the world space, or the acceleration of the object through the world space.

A more-sophisticated system implementing an embodiment might obtain a second image from the camera at a second, different exposure time when the camera is in a second, different camera location in the world space, obtain at least one more coordinate tuple from the mobile apparatus at a third, different acquisition time, synthesize a second estimated coordinate tuple, said second estimated coordinate tuple approximating the second, different camera location, identify the distinctive feature in the second image; and estimate at least a second parameter of the object in the world space, or compute an error estimate of the first parameter.

Once another parameter has been estimated (or the accuracy of the first parameter is improved), the system might alter the trajectory of the effector according to the second parameter or the error estimate.

While the effector of a system is in motion relative to the target, a second image may be obtained from the camera at a second, different exposure time, said second, different exposure time.

Mobile apparatus having at least two degrees of freedom of motion may benefit especially from an embodiment. And an embodiment can use a monocular camera or a camera having two or more image fields. The camera may at or near the effector, or it may be elsewhere on the mobile apparatus. For example, on a multi-jointed robot arm, the camera may be placed between intermediate joints, and not only at the final joint or on the effector. When the camera is placed away from the effector, the distance between the camera and the effector is often variable.

An embodiment can also be conceived as a method of guiding an effector of a mobile apparatus through a world space using condition data from sensors on the mobile apparatus and images from a set of cameras including at least one camera coupled to the mobile apparatus so at least one camera of the set of cameras moves when the mobile apparatus moves. Under this view, the embodiment would receive a series of sensor tuples from the mobile apparatus at a corresponding series of acquisition times, each sensor tuple including information to determine a position within the world space of at least one camera of the set of cameras at a corresponding acquisition time, receive a first image showing a first view of the world space from a first camera of the set of cameras; receive a second image showing a second, different view of the world space from a second camera of the set of cameras; identify a feature in the first image, said feature corresponding to an object in the world space; estimate a condition of the object based on the feature in the first image and at least one sensor tuple from the series of sensor tuples; identify the feature in the second image; and refine the estimate of the condition of the object based on the feature in the second image and at least a different sensor tuple from the series of sensor tuples.

The foregoing method might also include directing the mobile apparatus to move the effector through the world space relative to the object based on the refined estimate of the condition of the object. The path of the effector, under the direction of an embodiment, might be linear or nonlinear through the world space.

The foregoing method works well when each sensor tuple of the series of sensor tuples includes information to compute a position of the effector within the world space at the corresponding acquisition time. The method may allow the computation or estimation of the position of the object within the world space, the orientation of the object within the world space, the velocity of the object through the world space, or the acceleration of the object within the world space.

In some implementations, the method may use a first image produced by a first camera coupled to the mobile apparatus at a first camera position, and a second image produced by a second, different camera coupled to the mobile apparatus at a second, different camera position. The first image may be produced by the first camera while the first camera is at a first camera location in the world space, and the second image may be produced by the first camera while the first camera is at a second, different camera location in the world space.

An embodiment may alternatively comprise a mobile camera for capturing an image an object within a scene during an exposure time while the mobile camera is in motion relative to the object; a position calculating unit for recording and interpolating position and orientation data of the mobile camera, including position and orientation data during the exposure time; and a processing unit for receiving and processing the image and the position and orientation data, wherein the processing unit outputs into a computing device for calculating and generating the three-dimensional data of the object within the scene.

The applications of the present invention have been described largely by reference to specific examples and in terms of particular allocations of functionality to certain hardware and/or software components. However, those of skill in the art will recognize that control of mobile platforms by visual feedback can also be accomplished by software and hardware that distribute the functions of embodiments of this invention differently than herein described. Such variations and implementations are understood to be captured according to the following claims.

I claim:

1. A mobile apparatus, comprising:
a camera system mounted to the mobile apparatus, comprising a camera, the camera comprising a clock;
a programmable control system coupled to the mobile apparatus and to the camera, containing data and instructions to cause the programmable control system to:
receive from the camera a plurality of images of an object taken at respective successive exposure times while the object is in motion;
obtain from the clock a corresponding plurality of timestamps for the respective successive exposure times;
receive from the mobile apparatus a plurality of location-based data for the mobile apparatus at or around the respective successive exposure times and associate the received location-based data for the mobile apparatus at or around the respective successive exposure times with the plurality of timestamps for the respective successive exposure times;
estimate a plurality of locations of the camera at the respective successive exposure times based on the plurality of location-based data for the mobile apparatus at or around the exposure times associated with the plurality of timestamps for the respective successive exposure times;
analyze the plurality of images of the object taken at the respective successive exposure times and the estimated plurality of locations of the camera at the respective successive exposure times associated with the plurality of timestamps for the respective successive exposure times and determine therefrom a location of the object and an accurate three-dimensional model representing the object; and
instruct the mobile apparatus to move with respect to the location of the object, responsive to the analysis.

2. The apparatus of claim 1, wherein the data and instructions to cause the programmable control system to receive from the camera the plurality of images of the object taken at respective successive exposure times while the object is in motion, comprises data and instructions to cause the programmable control system to receive from the camera a plurality of two-dimensional images of the object taken at respective successive exposure times while the object is in motion;
wherein the further data and instructions to cause the programmable control system to analyze the plurality of images of the object taken at respective successive exposure times while the object is in motion and determine therefrom a location of the object, comprises data and instructions to cause the programmable control system to:
analyze the two-dimensional images of the object taken at the respective successive exposure times while the object is in motion and determine therefrom a plurality of locations of two-dimensional features of the object; and
determine, via photogrammetry, parameters of the accurate three-dimensional model representing the object based on the plurality of locations of two-dimensional features of the object.

3. The apparatus of claim 2, wherein the parameters of the accurate three-dimensional model representing the object are selected from a group of parameters consisting of: a location, an orientation, a size, a velocity, and an acceleration, of the object.

4. The apparatus of claim 1, wherein the mobile apparatus further comprises an effector by which to manipulate the object; and wherein the data and instructions are further configured to cause the programmable control system to perform an operation with respect to the object, the operation selected from a group of operations consisting of: moving the effector with respect to the object, and making contact between the effector and the object, based on the accurate three-dimensional model representing the object.

5. A mobile apparatus, comprising:

a camera system mounted to the mobile apparatus, comprising a camera, the camera comprising a clock;

a programmable control system coupled to the mobile apparatus and to the camera, containing data and instructions to cause the programmable control system to:

receive from the camera a plurality of two-dimensional images of an object taken at respective successive exposure times;

obtain from the clock a plurality of timestamps corresponding to the respective successive exposure times;

receive from the mobile apparatus a plurality of locations for the mobile apparatus at or around the respective successive exposure times and associate the received plurality of locations for the mobile apparatus at or around the respective successive exposure times with the plurality of timestamps for the respective successive exposure times;

estimate a plurality of locations of the camera at the respective successive exposure times based on the plurality of locations for the mobile apparatus at or around the respective successive exposure times associated with the plurality of timestamps for the respective successive exposure times; and analyze the plurality of two-dimensional images of the object taken at the respective successive exposure times and the estimated plurality of locations of the camera at the respective successive exposure times associated with the plurality of timestamps for the respective successive exposure times and determine therefrom a plurality of locations of two-dimensional features of the object;

determine, via photogrammetry, parameters of an accurate three-dimensional model representing the object based on the plurality of locations of two-dimensional features of the object; and instruct the mobile apparatus to move with respect to a location of the object, responsive to the analysis.

6. The apparatus of claim 5, wherein the mobile apparatus further comprises an effector by which to manipulate the object; and wherein the data and instructions are further configured to cause the programmable control system to perform an operation with respect to the object, the operation selected from a group of operations consisting of: moving the effector with respect to the object, and making contact between the effector and the object, based on the accurate three-dimensional model representing the object.

7. The apparatus of claim 5, wherein the parameters of the three-dimensional model representing the object are selected from a group of parameters consisting of: a location, an orientation, a size, a velocity, and an acceleration, of the object.

8. The apparatus of claim 5, wherein the data and instructions to cause the programmable control system to receive from the camera the plurality of two-dimensional images of the object taken at respective successive exposure times, comprises data and instructions to cause the programmable control system to receive from the camera the plurality of two-dimensional images of the object taken at respective successive exposure times while the mobile apparatus is in motion.

9. The apparatus of claim 5, wherein the data and instructions to cause the programmable control system to receive from the camera the plurality of two-dimensional images of the object taken at respective successive exposure times, comprises data and instructions to cause the programmable control system to receive from the camera the plurality of two-dimensional images of the object taken at respective successive exposure times while the object is in motion.

10. The mobile apparatus of claim 9, wherein the data and instructions to cause the programmable control system to estimate the plurality of locations of the camera at the respective successive exposure times based on the plurality of locations for the mobile apparatus at or around the respective successive exposure times associated with the plurality of timestamps for the respective successive exposure times, comprises data and instructions to cause the programmable control system to interpolate the location of the camera at an exposure time associated with a timestamp for the exposure time based on a first set of coordinates of a first location of the mobile apparatus at a first time before the exposure time and a second set of coordinates of a second location of the mobile apparatus at a second time after the exposure time.

11. The mobile apparatus of claim 9, wherein the camera system further comprises an inertial measurement unit (IMU) that measures velocity and/or acceleration of the camera;

wherein the data and instructions further cause the programmable control system to receive measured velocity and/or acceleration of the camera from the IMU; and wherein the data and instructions that cause the programmable control system to estimate the plurality of locations of the camera at the respective successive exposure times based on the plurality of locations for the mobile apparatus at or around the respective successive exposure times associated with the plurality of timestamps for the respective successive exposure times, comprises data and instructions that cause the programmable control system to estimate a location of the camera at an exposure time associated with a timestamp for the exposure time based on a location for the mobile apparatus at or around the exposure time associated with the timestamp for the exposure time and the received measured velocity and/or acceleration of the camera from the IMU.

12. The mobile apparatus of claim 11, wherein the data and instructions that cause the programmable control system to estimate the location of the camera at the exposure time associated with the timestamp for the exposure time based on the location for the mobile apparatus at or around the exposure time associated with the timestamp for the exposure time and the received measured velocity and/or acceleration of the camera from the IMU, comprises data and instructions that cause the programmable control system to extrapolate the location of the camera at the exposure time associated with the timestamp for the exposure time based on a set of coordinates of a location of the mobile apparatus either at a time before or after the exposure time.

\* \* \* \* \*